US012588080B2

(12) United States Patent
Ichimura et al.

(10) Patent No.: US 12,588,080 B2
(45) Date of Patent: Mar. 24, 2026

(54) COMMUNICATION APPARATUS, CONTROL METHOD, AND STORAGE MEDIUM

(71) Applicant: CANON KABUSHIKI KAISHA, Tokyo (JP)

(72) Inventors: Shinichi Ichimura, Kanagawa (JP); Masao Maeda, Kanagawa (JP); Naoki Aoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 18/322,385

(22) Filed: May 23, 2023

(65) Prior Publication Data

US 2023/0389090 A1 Nov. 30, 2023

(30) Foreign Application Priority Data

May 26, 2022 (JP) ................................. 2022-086418

(51) Int. Cl.
*H04W 76/10* (2018.01)
*H04W 84/12* (2009.01)

(52) U.S. Cl.
CPC ............ *H04W 76/10* (2018.02); *H04W 84/12* (2013.01)

(58) Field of Classification Search
CPC ...................................................... H04L 12/28
USPC ................................ 370/329, 401, 402, 403
See application file for complete search history.

(56) References Cited

U.S. PATENT DOCUMENTS

| | | | |
|---|---|---|---|
| 11,147,098 | B2 | 10/2021 | Xie |
| 2009/0310578 | A1 | 12/2009 | Convertino |
| 2010/0316025 | A1 | 12/2010 | Brandt |
| 2013/0196702 | A1 | 8/2013 | Shibata |
| 2014/0241187 | A1 | 8/2014 | Barkay |
| 2017/0013556 | A1 | 1/2017 | Tanaka |
| 2017/0339743 | A1 | 11/2017 | Watanabe |
| 2018/0034707 | A1 | 2/2018 | Aoki |
| 2021/0315056 | A1 | 10/2021 | Tsuchiya |
| 2022/0070879 | A1 | 3/2022 | Ryu |
| 2023/0269707 | A1 | 8/2023 | Zhu |
| 2023/0388086 | A1 | 11/2023 | Tsuchiya |
| 2023/0389058 | A1 | 11/2023 | Suga |
| 2023/0389114 | A1* | 11/2023 | Tsuzuki ................ H04W 76/25 |
| 2025/0168616 | A1 | 5/2025 | Park |

FOREIGN PATENT DOCUMENTS

| | | |
|---|---|---|
| EP | 2869476 A1 | 5/2015 |
| EP | 3944711 A1 | 1/2022 |
| JP | 2013157943 A | 8/2013 |
| JP | 2017208775 A | 11/2017 |
| JP | 2017208777 A | 11/2017 |
| JP | 2019161676 A | 9/2019 |
| JP | 2020108121 A | 7/2020 |
| WO | 2020166910 A1 | 8/2020 |

* cited by examiner

*Primary Examiner* — Dang T Ton
(74) *Attorney, Agent, or Firm* — Canon U.S.A., Inc. IP Division

(57) ABSTRACT

A communication apparatus is provided that is configured to perform an operation in a first mode in which the communication apparatus operates as a child station, and an operation in a second mode in which the communication apparatus operates as a parent station. The communication apparatus includes a control unit configured to perform control in such a manner that a channel which the communication apparatus uses in the second mode is not used in search while the communication apparatus is operating in the second mode.

20 Claims, 14 Drawing Sheets

FIG.2A

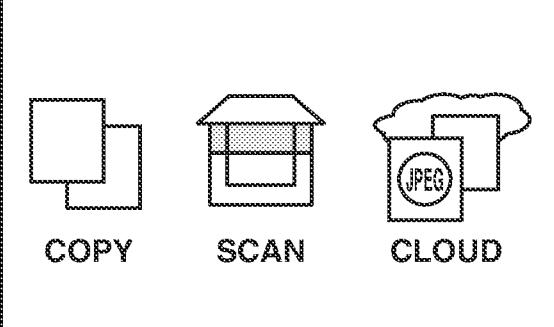

COPY　　SCAN　　CLOUD

FIG.2B

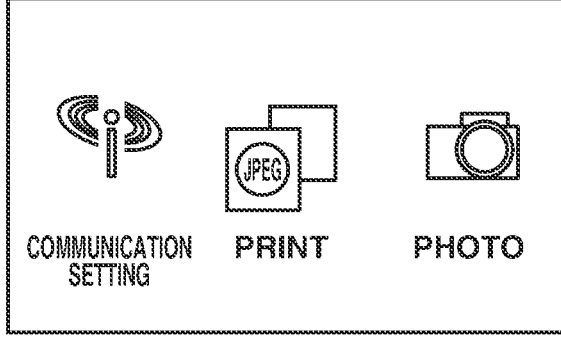

COMMUNICATION　PRINT　　PHOTO
SETTING

FIG.2C

| COMMUNICATION SETTING |
|---|
| WIRED LAN |
| WIRELESS LAN |
| WIRELESS DIRECT |
| Bluetooth® |

FIG.2D

| WIRELESS DIRECT SETTING |
|---|
| CHANGE NETWORK NAME (SSID) |
| CHANGE PASSWORD |
| ENABLE/DISABLE DIRECT CONNECTION MODE |
| SET FREQUENCY BAND |

FIG.2E

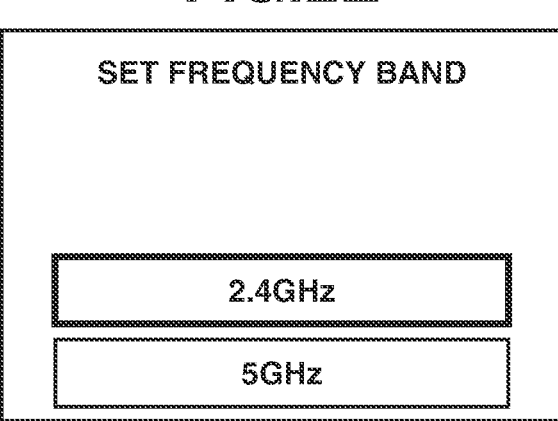

SET FREQUENCY BAND 2.4GHz

5GHz

FIG.2F

| WIRELESS LAN COMMUNICATION SETTING |
|---|
| CONNECT WITH SELECTED ACCESS POINT |
| CONNECT USING PC/SMARTPHONE |
| CONNECT USING WPS/AOSS |

FIG.6B

COMMUNICATION APPARATUS, CONTROL METHOD, AND STORAGE MEDIUM

BACKGROUND

Field

The present disclosure relates to a communication apparatus, a control method, and a storage medium.

Description of the Related Art

Japanese Patent Application Laid-Open No. 2013-157943 discusses a technique of matching a channel to be used by a wireless communication apparatus for establishing connection with an access point, and a channel to be used by the wireless communication apparatus for establishing connection with a mobile terminal via Wi-Fi Direct® (WED).

On the other hand, as more and more apparatuses each including a mode to operate as a child station, and a mode to operate as a parent station are used, improvements in convenience of such an apparatus are demanded.

SUMMARY

According to an aspect of the present disclosure, a communication apparatus is provided that is configured to perform an operation in a first mode in which the communication apparatus operates as a child station in accordance with a predetermined wireless communication standard, and an operation in a second mode in which the communication apparatus operates as a parent station in accordance with the predetermined wireless communication standard. The communication apparatus includes a search unit configured to perform search according to the predetermined wireless communication standard for one or more access points, an establishment unit configured to establish a wireless connection between an access point from the one or more access points discovered in the search by the search unit and the communication apparatus operating in the first mode using a channel used to discover the access point, and a control unit configured to perform control in such a manner that a channel which the communication apparatus uses in the second mode is not used in the search by the search unit while the communication apparatus is operating in the second mode.

Further features of the present disclosure will become apparent from the following description of exemplary embodiments with reference to the attached drawings.

BRIEF DESCRIPTION OF THE DRAWINGS

FIGS. 2A to 2F each illustrates an example of a screen to be displayed by an operation display unit of a communication apparatus.

FIGS. 6A and 6B illustrate an example of channel arrangement in each frequency band.

DESCRIPTION OF THE EMBODIMENTS

Hereinafter, exemplary embodiments of the present disclosure will be described with reference to the drawings. It is to be understood that the scope of the present invention also encompasses modifications and improvements of the exemplary embodiment to be described below that are appropriately made based on the general knowledge of the one skilled in the art without departing from the gist of the present invention.

A first exemplary embodiment will be described. An information processing apparatus and a communication apparatus included in a communication system of the present exemplary embodiment will be described. In the present exemplary embodiment, a smartphone is exemplified as the information processing apparatus, but the information processing apparatus is not limited to this. Various types of apparatus, such as a mobile terminal, a laptop personal computer (PC), a tablet terminal, a personal digital assistant (PDA), and a digital camera can be used as the information processing apparatus. In the present exemplary embodiment, a printer is exemplified as the communication apparatus, but the communication apparatus is not limited to this. Various types of apparatus can be used as long as the apparatus can perform wireless communication with the information processing apparatus. For example, when it comes to a printer to be used as the communication apparatus, examples of a printer can include an inkjet printer, a full-color laser beam printer, and a monochrome printer. In addition to a printer, examples that can be used also include a copier, a facsimile apparatus, a mobile terminal, a smartphone, a laptop PC, a tablet terminal, a PDA, a digital camera, a music play device, a television, and a smart speaker. Moreover, a multifunction peripheral including a plurality of functions, such as a copy function, a FAX function, and a printing function, can also be used.

Figure 1:
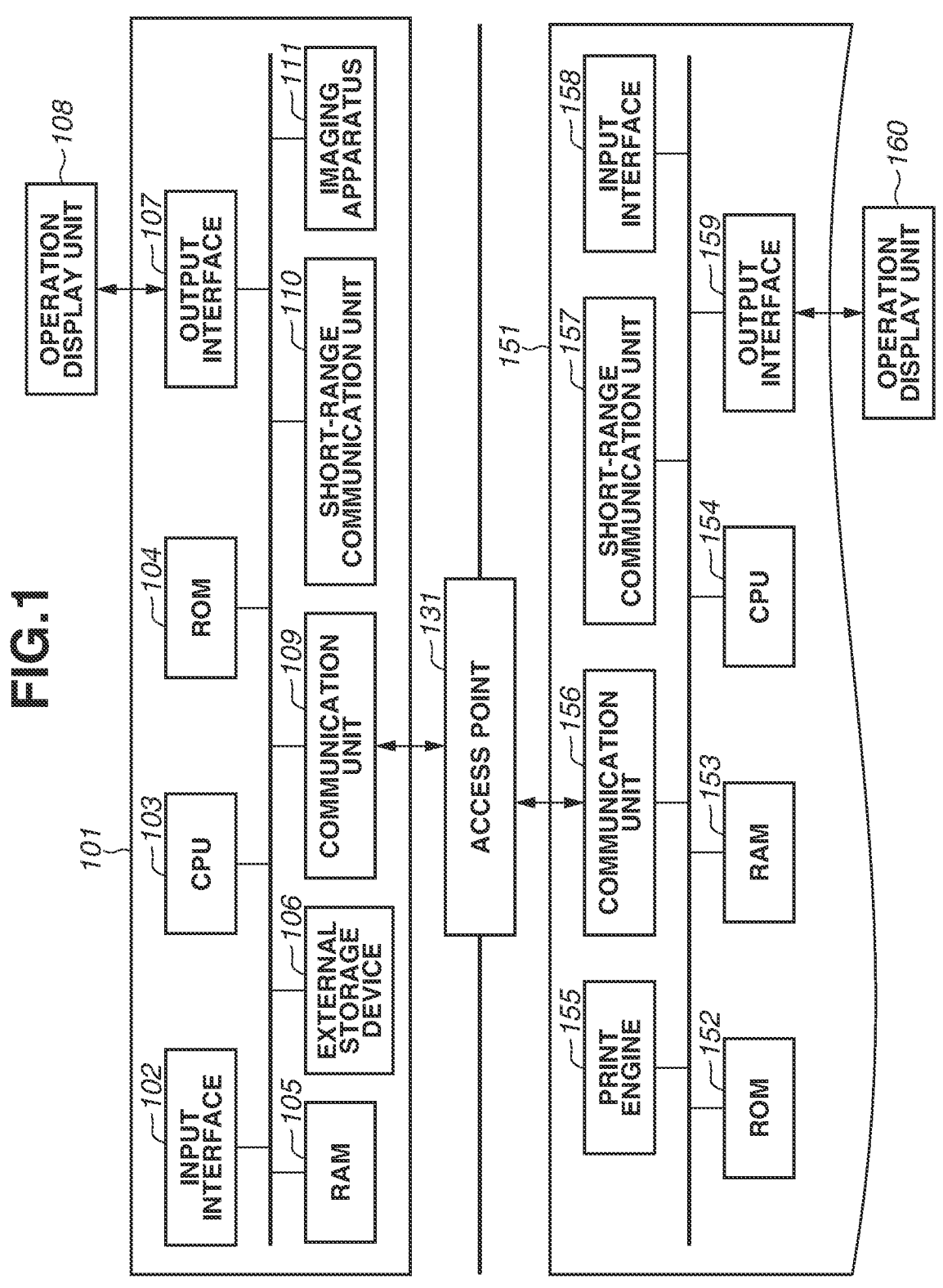
FIG. 1 illustrates a configuration example of a communication system.

First of all, a configuration of the information processing apparatus included in the communication system of the present exemplary embodiment, and a configuration of the communication apparatus that can communicate with the information processing apparatus will be described with reference to a block diagram illustrated in FIG. 1. In the present exemplary embodiment, the following configuration example will be described as an example in the present exemplary embodiment, but functions are not specifically limited to the functions illustrated in FIG. 1.

An information processing apparatus 101 includes an input interface 102, a central processing unit (CPU) 103, a read-only memory (ROM) 104, a random access memory (RAM) 105, an external storage device 106, an output interface 107, an operation display unit 108, a communication unit 109, a short-range communication unit 110, and an imaging apparatus 111.

The input interface 102 is an interface for receiving data inputs and operation instructions from a user, and includes a physical keyboard, a button, and a touch panel. The output interface 107 to be described below, and the input interface 102 may be configured in an identical manner, and an identical configuration may perform screen output and reception of operations from the user.

The CPU 103, a system control unit, generally controls the information processing apparatus 101.

The ROM 104 stores fixed data, such as control programs to be run by the CPU 103, data tables, and an embedded operating system (hereinafter, will be referred to as an OS) program. In the present exemplary embodiment, each control program stored in the ROM 104 performs software run control, such as scheduling, task switch, or interrupt processing, under the control of the embedded OS stored in the ROM 104.

The RAM 105 includes a static random access memory (SRAM) provided with a backup power source. Because data is held in the RAM 105 with a primary battery for data backup (not illustrated), the RAM 105 can store important data, such as program control variables, preventing the data from being deleted. The RAM 105 is also provided with a memory area for storing setting information and management data about the information processing apparatus 101. The RAM 105 is also used as a main memory and a work memory for the CPU 103.

The external storage device 106 includes an application that provides a print execution function (hereinafter, will be referred to as a printing application). The external storage device 106 also includes various types of program, such as a print information generation program for generating print information interpretable by the communication apparatus 151, and information transmission/reception control programs to be transmitted to and received from the communication apparatus 151 connected via the communication unit 109. The external storage device 106 stores various types of information to be used by these programs. The external storage device 106 also stores image data obtained from another information processing apparatus or the Internet via the communication unit 109.

The output interface 107 is an interface that controls the operation display unit 108 to display data and notify the user of the state of the information processing apparatus 101.

The operation display unit 108 includes a light emitting diode (LED) and a liquid crystal display (LCD), and displays data and notifies the user of the state of the information processing apparatus 101. By installing a software keyboard including keys, such as numerical entry keys, a mode setting key, a determination key, a cancel key, and a power key, on the operation display unit 108, inputs from the user may be received via the operation display unit 108.

The communication unit 109 is a component for connecting with an apparatus, such as the communication apparatus 151, and performing data communication. For example, the communication unit 109 can connect to an access point (not illustrated) in the communication apparatus 151. With the communication unit 109 and the access point in the communication apparatus 151 connecting with each other, the information processing apparatus 101 and the communication apparatus 151 is able to communicate with each other. Hereinafter, an access point may be represented as an AP. The communication unit 109 can directly communicate with the communication apparatus 151 via wireless communication, or communicate with the communication apparatus 151 via an access point 131 outside the information processing apparatus 101 and outside the communication apparatus 151. In the present exemplary embodiment, the Institute of Electrical and Electronics Engineers (IEEE) 802.11 series communication standard is used as a wireless communication method. More specifically, the IEEE 802.11 series communication standard is a standard for Wireless Fidelity (Wi-Fi®). Examples of the access point 131 include devices, such as a wireless local area network (LAN) router. In the present exemplary embodiment, a method by which the information processing apparatus 101 and the communication apparatus 151 directly connect with each other not via an external access point will be referred to as a direct connection method. A method by which the information processing apparatus 101 and the communication apparatus 151 connect with each other via the external access point 131 will be referred to as an infrastructure connection method.

The short-range communication unit 110 is a component for performing short-range communication with an apparatus, such as the communication apparatus 151, and performing data communication, and performs communication using a communication method different from that of the communication unit 109. Examples of short-range communication methods to be used by the short-range communication unit 110 include Bluetooth® and Near Field Communication (NFC). Bluetooth® may be Bluetooth® Classic or Bluetooth® Low Energy. The short-range communication unit 110 can connect with a short-range communication unit 157 in the communication apparatus 151.

The imaging apparatus 111 is an apparatus that converts an image captured using an image sensor into digital data. The digital data is once stored into the RAM 105. After that, the digital data is converted into a predetermined image format by a program run by the CPU 103, and stored into the external storage device 106 as image data.

A ROM 152 stores fixed data, such as control programs to be run by a CPU 154, data tables, and an OS program.

The communication apparatus 151 includes the ROM 152, a RAM 153, the CPU 154, a print engine 155, a communication unit 156, the short-range communication unit 157, an input interface 158, an output interface 159, and an operation display unit 160. With a connection mode (communication mode) set, the communication apparatus 151 can operate in the set connection mode.

The communication unit 156 is a component for the communication apparatus 151 connecting with another apparatus. In the present exemplary embodiment, the communication unit 156 performs communication in compliance with the IEEE 802.11 series communication standard. The communication unit 156 includes an access point for connecting with an apparatus, such as the information processing apparatus 101, as an access point in the communication apparatus 151. The access point can connect with the communication unit 109 of the information processing apparatus 101. The communication unit 156 can directly communicate with the information processing apparatus 101 via wireless communication, or can communicate with the information processing apparatus 101 via the access point 131. The communication unit 156 can include hardware functioning as an access point, or can operate as an access point by software for causing the communication unit 156 to function as an access point. In the present exemplary embodiment, the communication unit 156 and the short-range communication unit 157 are included in one wireless chip. More specifically, in the present exemplary embodiment, a combo chip supporting both the communication functionality in the IEEE 802.11 series communication standard and a communication function carried out in a short-range communication method is used. However, the configuration is not limited to this configuration, and the communication unit 156 and the short-range communication unit 157 can be included in wireless chips different from each other. In the present exemplary embodiment, a wireless chip supporting the Dynamic rapid channel switching (DRCS) function is used. The DRCS function is a function used when communication through infrastructure connection and communication through direct connection are performed in a time-division manner during concurrent operation as described below. Specifically, the DRCS function is a function that allows high-speed switching of a communication channel in use, between a state in which communication through infrastructure connection is being performed, and a state in which communication through direct connection is being performed. Hereinafter, a communication channel will be simply referred to as a channel. In the present exemplary embodiment, this function allows a channel used in communication through infrastructure connection and a channel used in communication through direct connection to be different from each other during concurrent operation. The configuration is not limited to this configuration. For example, the communication unit 156 can be included in two or more wireless chips including a wireless chip for an infrastructure connection mode and a wireless chip for a direct connection mode. With this configuration, a channel used in communication through infrastructure connection, and a channel used in communication through direct connection may be made different from each other during the concurrent operation.

The RAM 153 includes a dynamic RAM (DRAM) provided with a backup power source. Because data is held in the RAM 153 by power being supplied from the power source for data backup (not illustrated), the RAM 153 can store important data, such as program control variables, preventing the data from being deleted. The RAM 153 is also used as a main memory and a work memory for the CPU 154, and stores a receive buffer for temporarily storing print information received from the information processing apparatus 101, and various types of information.

The ROM 152 stores fixed data, such as control programs to be run by the CPU 154, data tables, and an OS program. In the present exemplary embodiment, each control program stored in the ROM 152 performs software execution control, such as scheduling, task switch, or interrupt processing, under the control of an embedded OS stored in the ROM 152. The ROM 152 is also provided with a memory area for storing data to be held also when power is not supplied, such as setting information and management data about the communication apparatus 151.

The CPU 154, a system control unit, generally controls the communication apparatus 151.

Based on information stored in the RAM 153 or a print job received from the information processing apparatus 101, the print engine 155 forms an image onto a recording medium, such as paper, using a recording material such as ink, and outputs a printed result. A print job to be transmitted from the information processing apparatus 101 at this time has a large amount of data to be transmitted in high-speed communication. The communication apparatus 151 therefore receives the print job via the communication unit 156 that can perform communication at higher speed than the short-range communication unit 157.

The short-range communication unit 157 is a component for performing short-range communication with an apparatus, such as the information processing apparatus 101, and performing data communication, and performs communication using a communication method different from a communication method for the communication unit 156. Examples of short-range communication methods used by the short-range communication unit 157 include Bluetooth® and NFC. Bluetooth® may be Bluetooth® Classic or Bluetooth® Low Energy. The short-range communication unit 157 can connect with the short-range communication unit 110.

The input interface 158 is an interface for receiving data inputs and operation instructions from a user, and includes a physical keyboard, a button, and a touch panel. The output interface 159 as described below, and the input interface 158 may be configured in an identical manner, and an identical configuration may perform screen output and reception of operations from the user. The output interface 159 is an interface that controls the operation display unit 160 to display data and notify the user of the state of the communication apparatus 151.

The operation display unit 160 includes a display unit, such as an LED and an LCD, and displays data and notifies the user of the state of the communication apparatus 151. By installing a software keyboard including keys, such as numerical entry keys, a mode setting key, a determination key, a cancel key, and a power key, on the operation display unit 160, inputs from the user may be received via the operation display unit 160.

<Example of Screen to Be Displayed by Operation Display Unit 160>

FIGS. 2A to 2F each schematically illustrate an example of a screen to be displayed by the operation display unit 160 of the communication apparatus 151. FIG. 2A illustrates an example of a home screen displayed when with the power of the communication apparatus 151 turned on, the communication apparatus 151 is in a state (idle state, standby state) of not performing an operation, such as printing or scanning. In FIG. 2A, a menu corresponding to the copy function, a menu corresponding to the scanning function, and a menu corresponding to the cloud function are displayed. By receiving a key operation or a scroll operation on a touch panel on the home screen illustrated in FIG. 2A, the communication apparatus 151 can seamlessly display a screen different from the home screen illustrated in FIG. 2A. FIG. 2B also illustrates a part of the home screen, and the display of a menu corresponding to the print function (printing function), a menu corresponding to the photo function, and a menu corresponding to the communication setting change function. If a menu is selected by a key operation or a touch panel operation performed by the user with the home screen illustrated in FIG. 2A or 2B displayed, the communication apparatus 151 can start to carry out the function corresponding to the selected menu.

FIG. 2C illustrates an example of a communication selection screen displayed with the menu corresponding to the communication setting change function selected on the home screen in FIG. 2B. The screen includes, for example, a menu for making settings related to wired LAN, a menu for making settings related to wireless LAN, a menu for making settings related to wireless direct, and a menu for making settings related to Bluetooth®. With settings made based on a selection of the menu for making settings related to wireless LAN, the communication apparatus 151 can start an operation in the infrastructure connection mode as described below. With settings made based on a selection of the menu for making settings related to wireless direct, the communication apparatus 151 can start an operation in the direct connection mode as described below. Settings made base on a selection of the menu for making settings related to Bluetooth® can include settings of enabling/disabling the Bluetooth® function, and settings related to pairing of Bluetooth®.

In the present exemplary embodiment, specifically, for example, with the menu for making settings related to wireless direct selected, a screen illustrated in FIG. 2D is displayed. A "change network name (service set identifier (SSID))" button is a button for the user changing an SSID of the communication apparatus 151 operating in the direct connection mode, to a value. A "change password" button is a button for the user changing a password for connecting with the communication apparatus 151 operating in the direct connection mode, to a value. An "enable/disable direct connection mode" button is a button for activating the direct connection mode as described below, or stopping the direct connection mode being activated. In the present exemplary embodiment, upon a selection of the "enable/disable direct connection mode" button, a Wi-Fi Direct® (WFD) mode as described below is activated, but the configuration is not limited to this configuration. Either a software AP mode as described below or the WFD mode may be activated, or both modes may be activated. A "set frequency band" button is a button for the user setting a frequency band to be used by the communication apparatus 151 operating in the direct connection mode to perform communication in the direct connection mode. Upon a selection of the "set frequency band" button, a screen illustrated in FIG. 2E is displayed. In the present exemplary embodiment, either 2.4 GHz or 5 GHz is selectable on the screen illustrated in FIG. 2E.

In the present exemplary embodiment, specifically, for example, upon a selection of the menu for making settings related to wireless LAN, a screen illustrated in FIG. 2F is displayed. A "connect with selected access point" button is a button for establishing the infrastructure connection as described below, using a first method according to the present exemplary embodiment. The first method is a method of establishing the infrastructure connection with an access point selected from among a list of access points discovered by search performed by the communication apparatus 151, and this method will be described in detail below. A "connect using PC/smartphone" button is a button for establishing the infrastructure connection of the communication apparatus 151 using a second method according to the present exemplary embodiment. The second method is a method of transmitting information for connecting with an access point, to the communication apparatus 151 from an information processing apparatus, such as a PC or a smartphone, and the communication apparatus 151 establishing the infrastructure connection with the access point using the information. With the "connect using PC/smartphone" button selected, the communication apparatus 151 operates as a software AP for connecting with a PC or a smartphone. A "connect using Wi-Fi Protected Setup™ (WPS)/AirStation One-Touch Secure System™ (AOSS)" button is a button for establishing the infrastructure connection of the communication apparatus 151 using a third method according to the present exemplary embodiment.

The third method is a method of the communication apparatus 151 establishing the infrastructure connection with an access point using a known setting method such as WPS or AOSS.

The methods of the communication apparatus 151 establishing the infrastructure connection are not limited to the above-described methods. In transmitting connection information for connecting with the access point 131, to the communication apparatus 151, for example, communication that uses the short-range communication method or a Wi-Fi Easy Connect™ function that uses Device Provisioning Protocol (DPP) may be used. In addition, a button for establishing the infrastructure connection using such a method may be displayed on the screen illustrated in FIG. 2F.

<Direct Connection Method>

The direct connection refers to a form in which apparatuses wirelessly connect with each other directly (i.e., on a peer-to-peer (P2P) basis) not via an external apparatus, such as the access point 131. The communication apparatus 151 can operate in a mode (direct connection mode) for performing communication through direct connection, as one of connection modes. There is a plurality of modes for performing communication through direct connection in Wi-Fi® communication, such as the software AP mode and the WFD mode.

A mode for establishing direct connection via WFD will be referred to as the WFD mode. WFD is a standard stipulated by Wi-Fi Alliance, and is a standard included in the IEEE 802.11 series communication standard. In the WFD mode, after search for a device serving as a communication partner is performed using a device search command, roles of a group owner (GO) in P2P communication and a client in P2P communication are determined, and then, the remaining wireless connection processing is performed. A GO corresponds to a parent station (parent unit) in Wi-Fi® communication, and a client corresponds to a child station (child unit) in Wi-Fi® communication. The role determination corresponds to GO Negotiation in P2P communication, for example. In the WFD mode before role determination is performed, the communication apparatus 151 operates as neither a parent station nor a child station. Specifically, first of all, a device issues a device search command to search for another device to be connected in the WFD mode among other devices to perform communication with the device. If the other device serving as the communication partner is discovered, both of the two devices check information regarding services and functions that can be provided by the two devices. This device provision information check is optional, and may not be performed. The device provision information check phase corresponds to Provision Discovery in P2P communication, for example. Next, by checking the device provision information with each other, which device to operate as the client in P2P communication, and which device to operate as the GO in P2P communication are determined as their roles. Next, if the client and the GO are determined, both of the two devices exchange parameters for performing communication via WFD. Based on the exchanged parameters, the client and the GO in P2P communication perform the remaining wireless connection processing, and Internet Protocol (IP) connection processing. In the WFD mode, the communication apparatus 151 may always operate as a GO without performing the above-described GO Negotiation. In other words, the communication apparatus 151 may operate in the WFD mode as an Autonomous GO mode. A state in which the communication apparatus 151 is operating in the WFD mode can be rephrased as a state in which with connection via WFD not established, the communication apparatus 151 is operating as a GO, or a state in which with connection via WFD established, the communication apparatus 151 is operating as a GO, for example.

In the software AP mode, between two devices to perform communication with each other (for example, the information processing apparatus 101 and the communication apparatus 151), one device (for example, the information processing apparatus 101) operates as a client having a function of issuing requests for various types of service. The other device carries out an access point function in Wi-Fi® communication with settings of software. A software AP corresponds to a parent station in Wi-Fi® communication, and a client corresponds to a child station in Wi-Fi® communication. In the software AP mode, the client searches for a device to operate as a software AP using a device search command. If the software AP is discovered, the client and the software AP perform the remaining wireless connection processing (establishment of wireless connection, etc.). After that, the client and the software AP perform IP connection processing (allocation of IP addresses, etc.). Commands and parameters defined by the Wi-Fi® standard can be used as commands and parameters to be transmitted and received in establishing wireless connection between the client and the software AP, and the description thereof will be omitted.

In the present exemplary embodiment, the communication apparatus 151 that has established and then maintains direct connection operates as a parent station in a network to which the communication apparatus 151 belongs. A parent station refers to an apparatus that establishes a wireless network and that provides a child station with parameters to be used in connection to the wireless network. Parameters used in connection to the wireless network is related to a channel to be used by the parent station, for example. By receiving parameters, the child station connects to the wireless network established by the parent station, using the channel used by the parent station. In the direct connection mode, the communication apparatus 151 operates as a parent station, so that the communication apparatus 151 can determine a frequency band and a channel to be used for communication in the direct connection mode. In the present exemplary embodiment, the communication apparatus 151 can use a channel corresponding to the 2.4-GHz frequency band, and a channel corresponding to the 5-GHz frequency band, for communication in the direct connection mode. The user can set a frequency band to be used (i.e., a frequency band of a channel to be used) through a setting made on the screen illustrated in FIG. 2E. More specifically, with 2.4 GHz selected on the screen illustrated in FIG. 2E, the communication apparatus 151 uses a channel corresponding to the 2.4-GHz frequency band, for communication in the direct connection mode. On the other hand, with 5 GHz selected on the screen illustrated in FIG. 2E, the communication apparatus 151 uses a channel corresponding to the 5-GHz frequency band, for communication in the direct connection mode. In the present exemplary embodiment, even if 5 GHz is selected on the screen illustrated in FIG. 2E, the communication apparatus 151 does not use channels corresponding to the Dynamic Frequency Selection (DFS) bands included in the 5-GHz frequency band, for communication in the direct connection mode. In other words, the communication apparatus 151 uses a channel corresponding to a frequency bandwidth other than the DFS bands included in the 5-GHz frequency band, for communication in the direct connection mode. If radar waves are detected in a channel in current use that corresponds to a DFS band, the currently-used channel is changed. Such a frequency band in which a channel change can occur due to the detection of radar waves refers to a DFS band. For example, when a wireless chip supporting the DFS functionality is used, a channel corresponding to a DFS band included in the 5-GHz frequency band may be usable for communication in the direct connection mode. A channel determined to be a channel to be used in the direct connection mode is used in communication performed via direct connection. Further-more, the channel is also used for the transmission of a beacon signal from a parent station, and the transmission of a response to a received command. In other words, the channel is used for communication processing with direct connection not established, as well as for communication processing in the direct connection mode with direct connection established.

The above description has been given of a configuration in which the user can set a channel to be used in the direct connection mode from between a channel corresponding to the 2.4-GHz frequency band and a channel corresponding to the 5-GHz frequency band, but the configuration is not limited to this configuration. A configuration may be used of allowing the user to set what number channel will be used in the direct connection mode by receiving a designation of the number. A channel to be used in the direct connection mode may be preset in the communication apparatus 151 without being set by the user.

The above description has been given of a configuration in which the communication apparatus 151 can use the 2.4-GHz frequency band and the 5-GHz frequency band, but the configuration is not limited to this configuration. The communication apparatus 151 may be able to use a different frequency band. A different frequency band may be used for processing for which the 2.4-GHz frequency band or the frequency band is used in the present exemplary embodiment. For example, the frequency band can be used in the IEEE 802.11ad standard. The 60-GHz frequency band may therefore be used as the above-described different frequency band.

Hereinafter, a wireless connection sequence in each mode will be described with reference to FIGS. 3 and 4.

Figure 3:
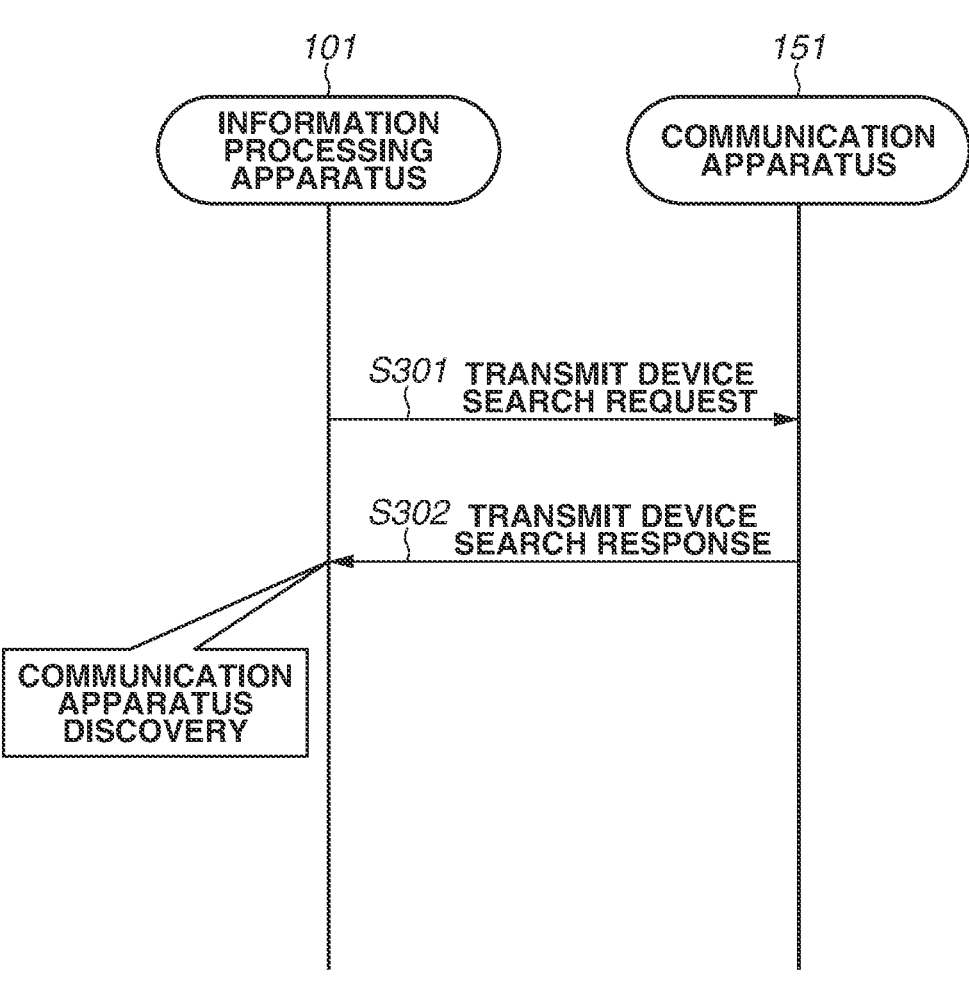
FIG. 3 illustrates an example of a wireless connection sequence in a software access point (AP) mode.

FIG. 3 illustrates a wireless connection sequence in the software AP mode. Processing to be performed by each apparatus in this sequence is performed by the CPU included in the corresponding apparatus, loading various types of program stored in a memory such as the ROM included in the corresponding apparatus, onto the RAM, and running the programs. This sequence is started in a state in which the information processing apparatus 101 operates as the client and the communication apparatus 151 operates as the software AP, and the communication apparatus 151 is transmitting a beacon signal. When a predetermined operation for operating as the software AP from the user is received by the communication apparatus 151, the communication apparatus 151 starts an operation as the software AP. The predetermined operation for operating as the software AP is an operation of selecting the "enable/disable direct connection mode" button, for example. The operation corresponds to an operation for activating the direct connection mode.

First of all, in step S301, the information processing apparatus 101 transmits a device search command using channels usable by the information processing apparatus 101 sequentially, and searches for an apparatus to operate as the software AP.

In step S302, if the device search command transmitted from the information processing apparatus 101 is received by the communication apparatus 151, the communication apparatus 151 transmits a device search response as a response to the device search command to the information processing apparatus 101. The communication apparatus 151 does not transmit a device search response to a device search command transmitted using a channel other than the channels usable by the communication apparatus 151. For example, if a channel usable by the communication apparatus 151 is a fourth channel, the communication apparatus 151 does not transmit a device search response to a device search command transmitted using a first channel. Thus, if the information processing apparatus 101 has not received a response from the communication apparatus 151 for a certain period of time or more since transmitting a device search command using the first channel, the information processing apparatus 101 transmits a device search command using a second channel. The information processing apparatus 101 repeats the above-described trial while incrementing the number of a channel to be used. Then, for example, if a device search command transmitted from the information processing apparatus 101 using the fourth channel is received by the communication apparatus 151, the communication apparatus 151 transmits a device search response to the information processing apparatus 101. Consequently, the information processing apparatus 101 discovers the communication apparatus 151. The channel used in the transmission of the device search response is determined to be a channel to be subsequently used in communication between the information processing apparatus 101 and the communication apparatus 151. In other words, a channel to be used in communication between the information processing apparatus 101 and the communication apparatus 151 is determined by the communication apparatus 151 operating as the software AP.

After the information processing apparatus 101 discovers the communication apparatus 151, the information processing apparatus 101 and the communication apparatus 151 perform known wireless connection establishment processing. Specifically, processing, such as the transmission of a connection request, authentication of the connection request, and allocation of an IP address, is performed. Further, commands and parameters prescribed by the Wi-Fi® standard are used as commands and parameters to be transmitted and received during the processing performed of the wireless connection establishment between the information processing apparatus 101 and the communication apparatus 151, and the description thereof will be omitted.

Figure 4:
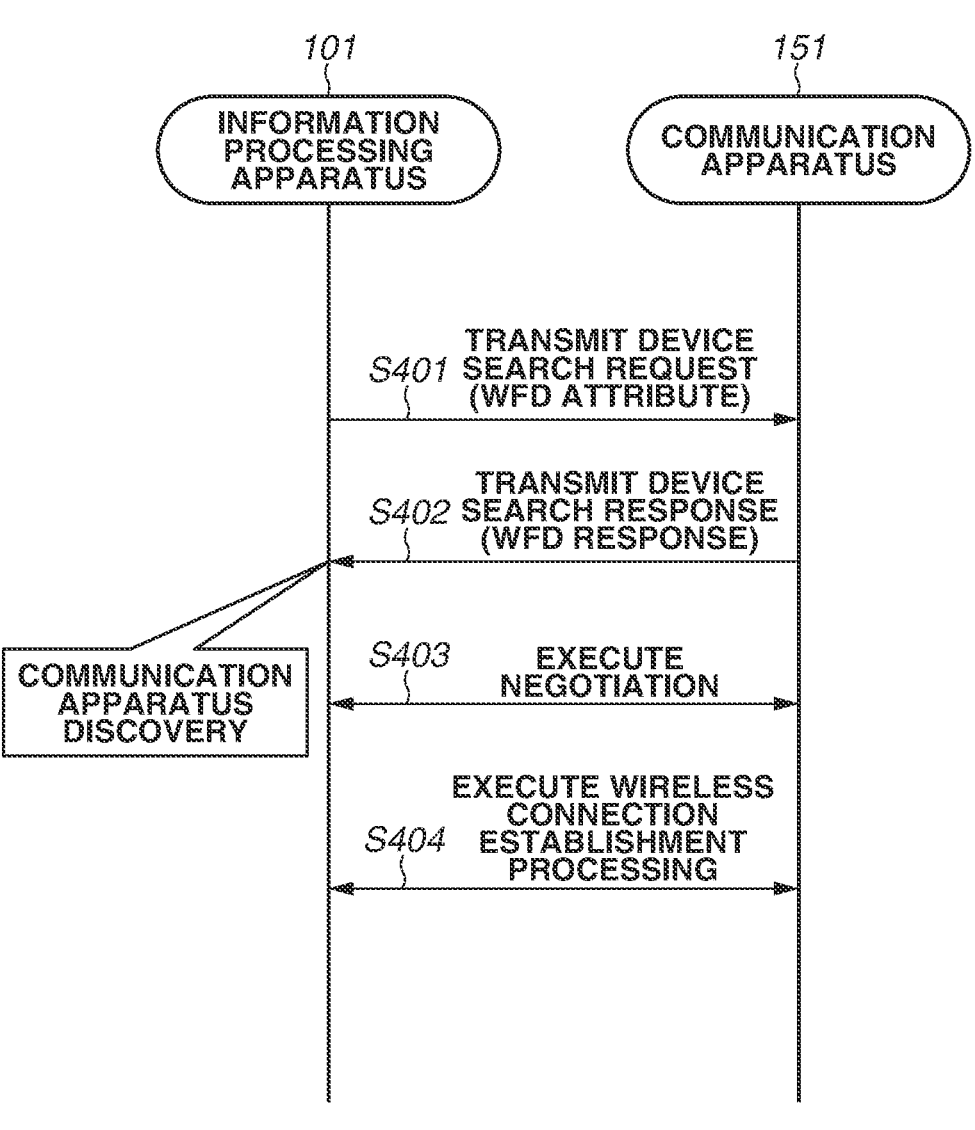
FIG. 4 illustrates an example of a wireless connection sequence in a Wi-Fi Direct® (WFD) mode.

FIG. 4 illustrates a wireless connection sequence in the WFD mode. Processing to be performed by each apparatus in this sequence is performed by the CPU included in the corresponding apparatus, loading various types of program stored in a memory such as the ROM included in the corresponding apparatus, onto the RAM, and running the programs. The processing is started when a predetermined operation for establishing connection via WFD is received from the user with a predetermined application for carrying out a WFD function activated by each apparatus. The predetermined operation for establishing connection via WFD is an operation of selecting the "enable/disable direct connection mode" button, for example. The operation corresponds to an operation for activating the direct connection mode.

First of all, in step S401, the information processing apparatus 101 transmits a device search command, and searches for an apparatus supporting the WFD function, as the communication partner apparatus.

In step S402, if the received device search command is a command transmitted using the same channel as the channel being used in the direct connection mode, the communication apparatus 151 transmits a device search response as a response to the device search command to the information processing apparatus 101. The information processing apparatus 101 thus discovers the communication apparatus 151 as an apparatus supporting the WFD function. After the information processing apparatus 101 discovers the communication apparatus 151, the information processing apparatus 101 and the communication apparatus 151 may perform processing of exchanging information regarding services and functions that can be provided by the information processing apparatus 101 and the communication apparatus 151.

In step S403, the information processing apparatus 101 and the communication apparatus 151 perform GO Negotiation. After the client and the GO are determined, the client and the GO exchange parameters for performing communication via WFD. Based on the exchanged parameters, the client and the GO in P2P communication perform the remaining wireless connection processing and IP connection processing. As described above, by the communication apparatus 151 operating in the Autonomous GO mode, GO Negotiation may be omitted, and the communication apparatus 151 may always operate as a GO. If the communication apparatus 151 operates as a GO, the communication apparatus 151 determines, as a parent station, a frequency band and a channel that are to be used in WFD communication. Thus, the communication apparatus 151 operating as a GO can select either a frequency band of 5 GHz or 2.4 GHz as a frequency band to be used, and select a channel to be used, from among channels corresponding to the determined frequency band.

In step S404, based on the exchanged parameters, the information processing apparatus 101 and the communication apparatus 151 perform wireless connection establishment processing using the channel determined by the GO.

<Infrastructure Connection Method>

The infrastructure connection is a connection mode for connecting with an access point (for example, the access point 131) that controls a network of devices that are to perform communication (for example, the information processing apparatus 101 and the communication apparatus 151), and for the devices communicating with each other via the access point. The communication apparatus 151 can also operate in a mode (infrastructure connection mode) for performing communication via infrastructure connection, as one of connection modes.

In the infrastructure connection, each device searches for an access point using a device search command. If the access point is discovered, the devices and the access point perform the remaining wireless connection processing (wireless connection establishment, etc.). After that, the devices and the access point perform IP connection processing (allocation of IP addresses, etc.). The commands and parameters prescribed by the Wi-Fi® standard are used as commands and parameters that are to be transmitted and received when wireless connection is established between the devices and the access point, and the description thereof will be omitted.

When the communication apparatus 151 operates in the infrastructure connection mode in the present exemplary embodiment, the access point 131 operates as the parent station and the communication apparatus 151 operates as the child unit. In other words, in the present exemplary embodiment, the infrastructure connection refers to connection between the communication apparatus 151 operating as a child unit, and an apparatus operating as a parent unit. The communication apparatus 151 that has established infrastructure connection and the information processing apparatus 101 that has also established infrastructure connection with the access point 131 can perform communication via the access point 131. A channel to be used in communication via infrastructure connection is determined by the access point 131, so that the communication apparatus 151 performs communication via infrastructure connection using the channel determined by the access point 131. In the present exemplary embodiment, the communication apparatus 151 can use a channel in the 2.4-GHz frequency band and a channel in the 5-GHz frequency band in communication via infrastructure connection. The communication apparatus 151 can also use a channel in the DFS band included in the 5-GHz frequency band in communication via infrastructure connection. To communicate with the communication apparatus 151 via the access point 131, the information processing apparatus 101 will recognize the communication apparatus 151 that belongs to a network formed by the access point 131, the network to which the information processing apparatus 101 belongs.

In the present exemplary embodiment, the communication apparatus 151 can concurrently establish direct connection and infrastructure connection. In other words, the communication apparatus 151 can concurrently establish Wi-Fi® connection in which the communication apparatus 151 operates as a child unit, and Wi-Fi® connection in which the communication apparatus 151 operates as a parent unit. Operating with the above-described two connections concurrently established in this manner refers to a concurrent operation.

Figure 5:
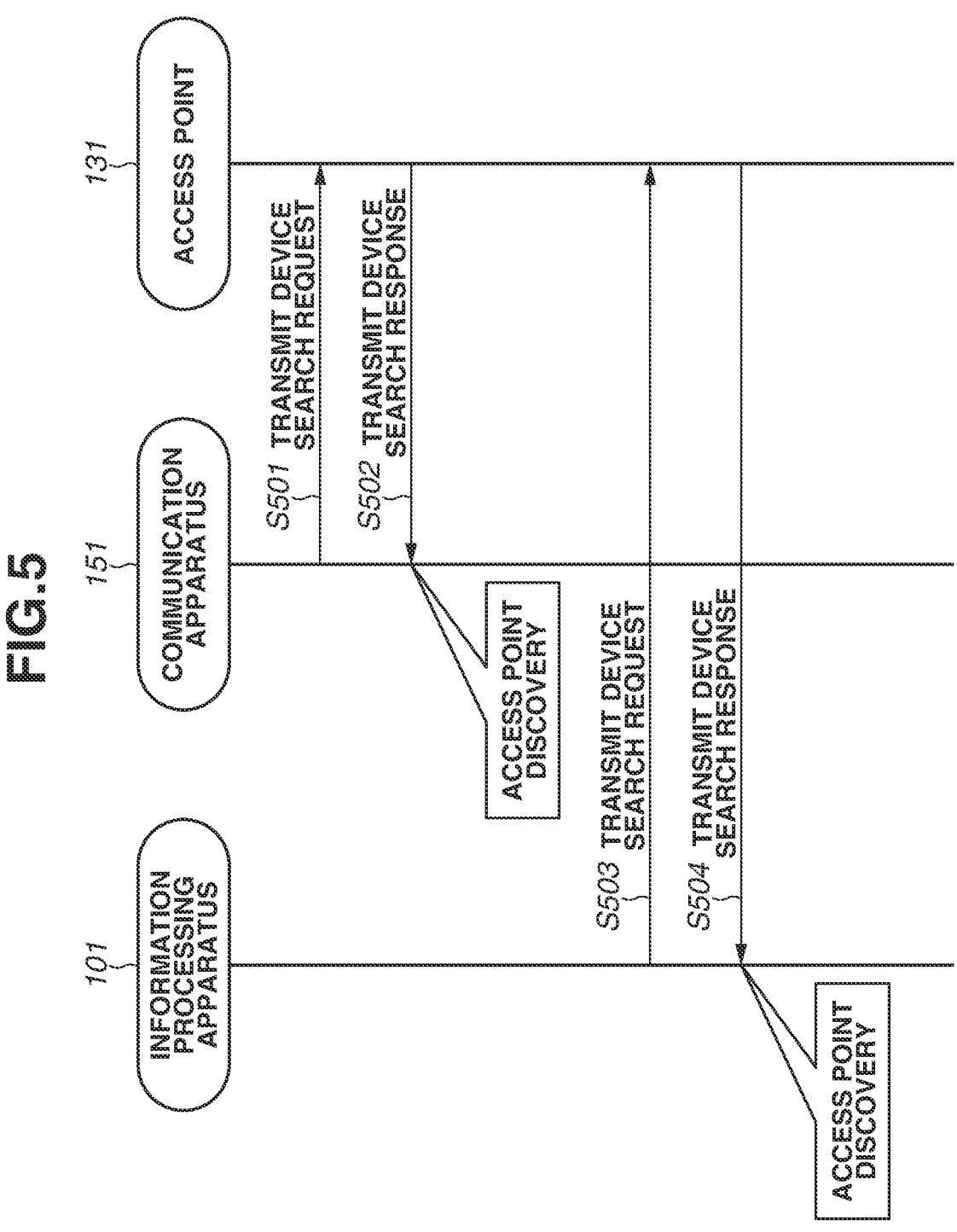
FIG. 5 illustrates an example of a wireless connection sequence in an infrastructure connection mode.

FIG. 5 illustrates a wireless connection sequence in the infrastructure connection mode. Processing to be performed by each apparatus in this sequence is performed by the CPU included in a corresponding apparatus, loading various types of program stored in a memory such as a ROM included in the corresponding apparatus, onto a RAM, and running the programs. If a predetermined operation for operating in the infrastructure connection mode from the user is received by the communication apparatus 151, the communication apparatus 151 starts an operation in the infrastructure connection mode. A predetermined operation for operating in the infrastructure connection mode is an operation of selecting the "connect with selected access point" button, for example.

First of all, in step S501, the communication apparatus 151 transmits a device search command sequentially using channels usable by the communication apparatus 151, and searches for an access point existing near the communication apparatus 151.

In step S502, if the device search command transmitted from the communication apparatus 151 is received by the access point 131, the access point 131 transmits a device search response as a response to the device search command to the communication apparatus 151. The access point 131 transmits the device search response to the device search command alone transmitted using a channel usable by the access point 131.

The communication apparatus 151 thus discovers the access point 131. The channel used in the transmission of the device search response is determined to be a channel to be subsequently used in communication between the communication apparatus 151 and the access point 131. In other words, a channel to be used for communication in the infrastructure connection mode is determined by the access point 131. After that, the communication apparatus 151 displays a list of discovered access points, and receives a selection from the user. In this example, it is assumed that the access point 131 is selected.

After that, the communication apparatus 151 and the access point 131 selected by the user perform known wireless connection establishment processing. Specifically, processing, such as the transmission of a connection request, authentication of the connection request, and allocation of IP addresses is performed. Similarly to the P2P mode, the commands and parameters prescribed by the Wi-Fi® standard are used as commands and parameters that are to be transmitted and received during the wireless connection establishment processing performed between the information processing apparatus 101 and the communication apparatus 151, and the description thereof will be omitted.

In steps S503 and S504, processing similar to the processing in steps S501 and S502 is performed between the information processing apparatus 101 and the access point 131. At this time, the access point 131 transmits a device search response command to the information processing apparatus 101 using the channel being used in communication with the communication apparatus 151. In other words, the access point 131 communicates with the communication apparatus 151 and the information processing apparatus 101 using the same channel.

This described-above configuration allows the communication apparatus 151 and the information processing apparatus 101 to connect and then communicate with each other via the access point 131.

<Channel Arrangement of Wi-Fi® Communication>

Figure 6A:
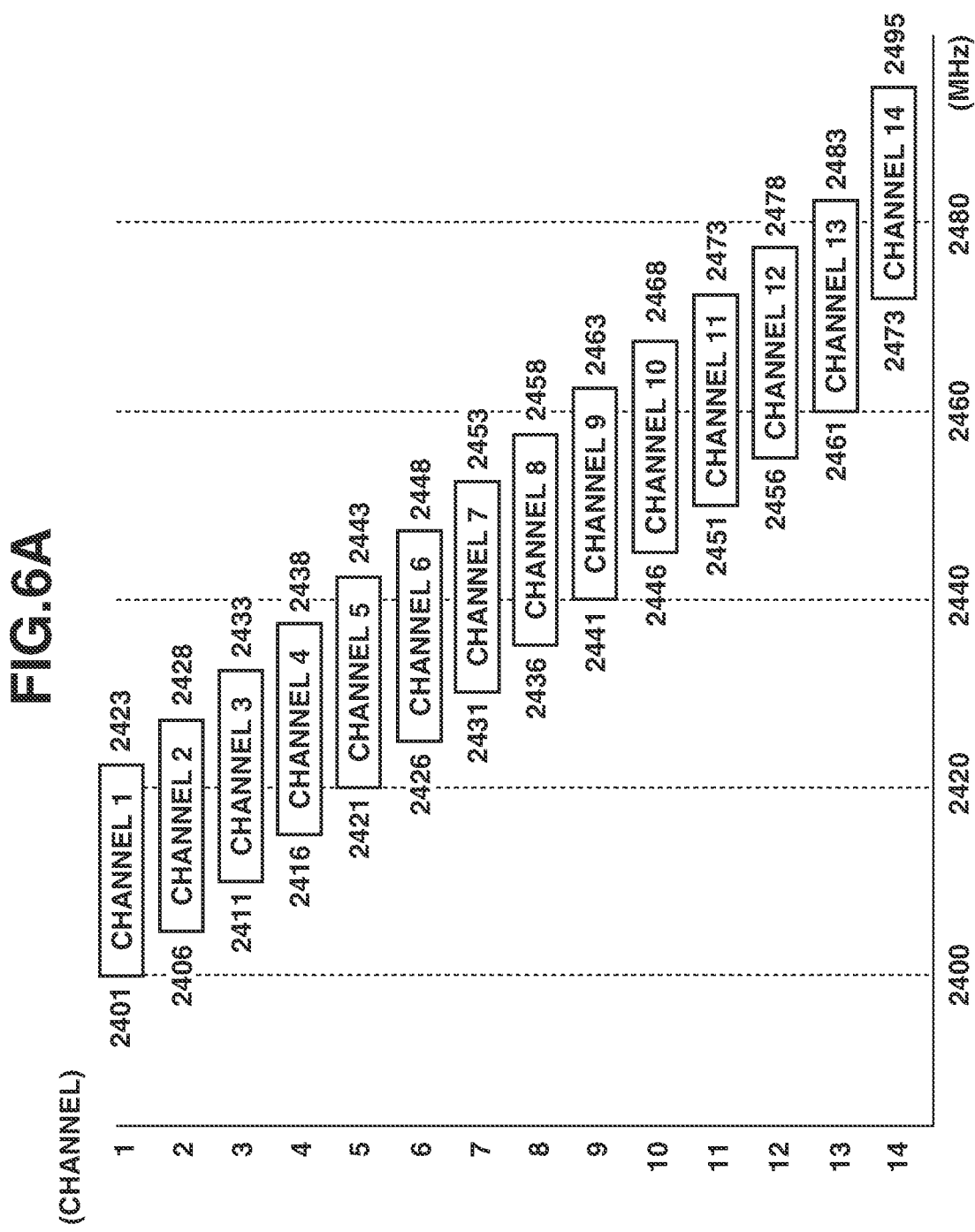
Figure 6B:
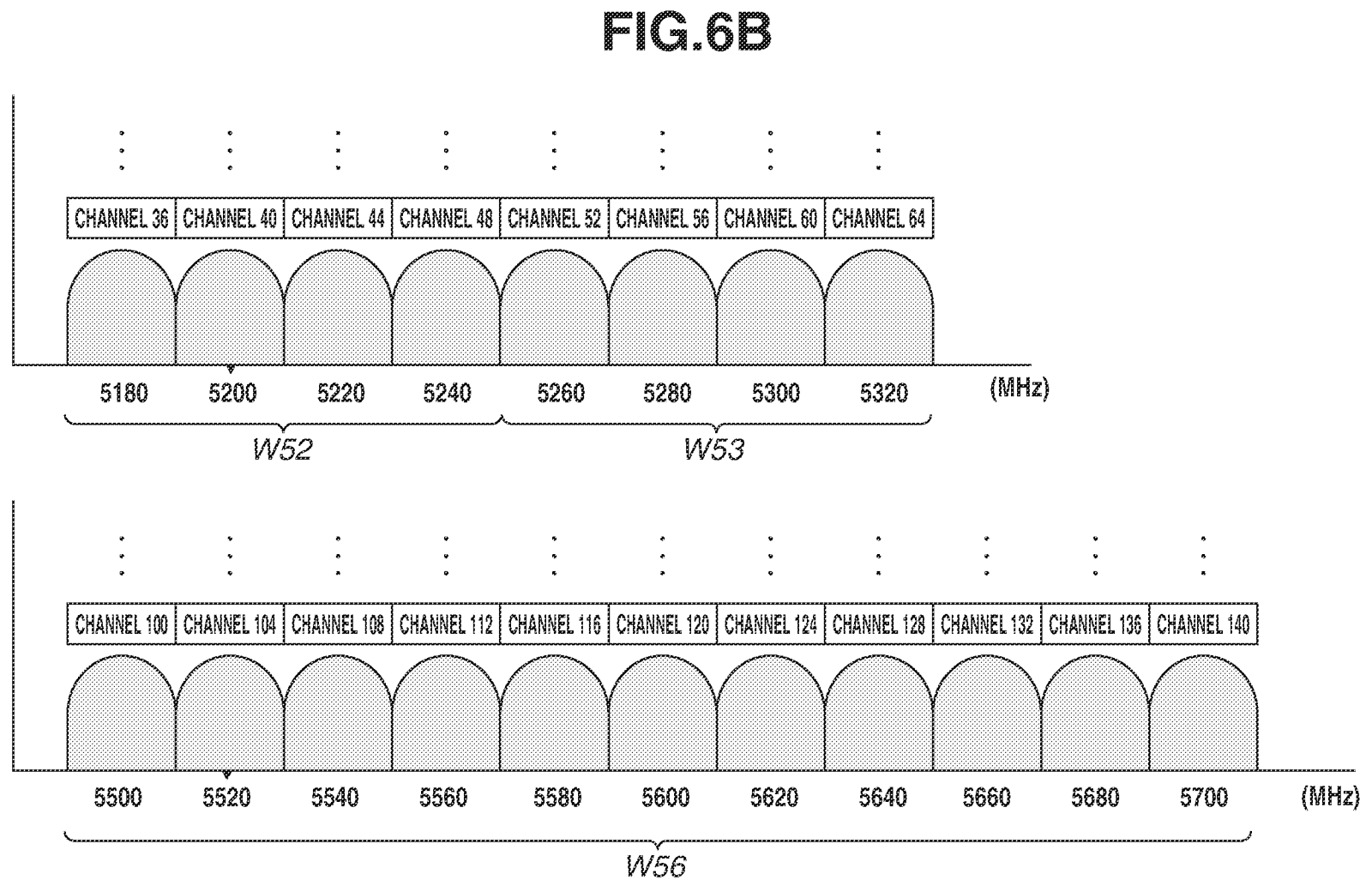

FIG. 6A illustrates channel arrangement in the 2.4-GHz frequency band and FIG. 6B illustrates channel arrangement in the 5-GHz frequency band of Wi-Fi® communication. In Wi-Fi® communication, the 2.4-GHz frequency band, which is divided into channels each having a bandwidth of 22 MHz, is used. Numbers are each allocated to a channel. The channels corresponding to the 2.4-GHz frequency band are channels 1 to 14. The 5-GHz frequency band, which is divided into channels each having a bandwidth of 20 MHz, is used, and there are no channels that include the same frequency. The channels each corresponding to a frequency bandwidth other than the DFS bands in the 5-GHz frequency band is channels called W52. Specifically, W52 consists of channels 36, 40, 44, and 48. The channels in the DFS bands in the 5-GHz frequency band are channels called W53 and W56. Specifically, W53 consists of channels 52, 56, 60, and 64, and W56 consists of channels 100, 104, 108, 112, 116, 120, 124, 128, 132, 136, and 140.

As described above, in the present exemplary embodiment, the communication apparatus 151 can perform the concurrent operation as an operation of concurrently maintaining the infrastructure connection mode and the direct connection mode. At this time, if a channel to be used in the infrastructure connection mode and a channel to be used in the direct connection mode are the same, radio wave interference can occur in communication in both modes. Even in such a case, control can be performed, for example, using the DRCS function so as not to cause radio wave interference between infrastructure connection and direct connection established by the communication apparatus 151. Nevertheless, also in this form using the DRCS function, interference of communication between an AP infrastructure-connected with the communication apparatus 151 and another apparatus can occur on communication of the communication apparatus 151 in the direct connection mode.

In the present exemplary embodiment, control for solving the above-described issue is performed.

<Control to be Performed if Direct Connection Mode is Newly Activated>

Figure 7:
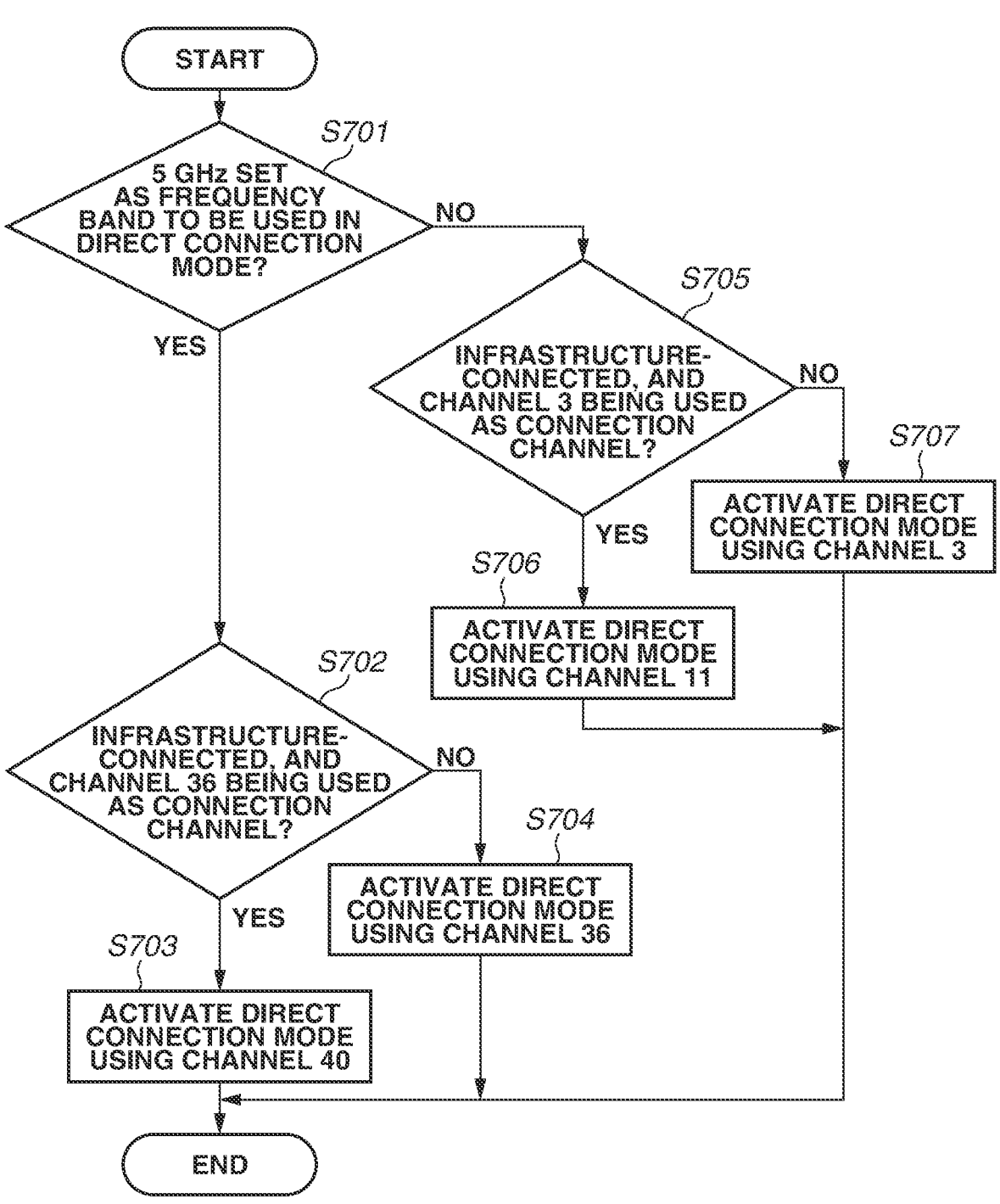
FIG. 7 is a flowchart illustrating processing to be performed by a communication apparatus.

Processing to be performed by the communication apparatus 151 in the present exemplary embodiment will be described with reference to FIG. 7. The processing to be performed by the communication apparatus 151 in this flowchart is performed by the CPU 154 loading various types of program stored in a memory such as the ROM 152, onto the RAM 153, and running the programs. The processing is started if processing that triggers the activation of the direct connection mode is performed, for example, if the above-described operation for activating the direct connection mode from the user is received by the communication apparatus 151. The processing that triggers the activation of the direct connection mode includes processing to be performed in the processing to be described below with reference to FIG. 8, 9, or 10, for example, in addition to the reception of the operation for activating the direct connection mode to be performed on the screen illustrated in FIG. 2D. More specifically, for example, the processing is processing of stopping the direct connection mode by newly establishing infrastructure connection during an operation in the direct connection mode. In the present exemplary embodiment, the communication apparatus 151 has a function of restarting an operation in a communication mode at the time of power-on, the communication mode in which the communication apparatus 151 was operating when the power of the communication apparatus 151 was turned off. The processing that triggers the activation of the direct connection mode is, for example, processing of receiving a power-on operation after the power is turned off while the communication apparatus 151 is operating in the direct connection mode. In the present exemplary embodiment, if the communication apparatus 151 is performing the concurrent operation when the power of the communication apparatus 151 is turned off, upon power-on, the communication apparatus 151 initially starts an operation in the infrastructure connection mode to perform processing of reconnecting with an AP. Then, based on the start of reconnection processing, the communication apparatus 151 starts an operation in the direct connection mode. At this time, the communication apparatus 151 may start an operation in the direct connection mode based on the lapse of a predetermined time since the start of the reconnection processing. Alternatively, the communication apparatus 151 may start an operation in the direct connection mode based on the connection established between an AP and the communication apparatus 151 by the reconnection processing, or based on a time-out caused by a failure in connection with an AP by reconnection processing.

In step S701, the CPU 154 determines whether 5 GHz is set on the screen illustrated in FIG. 2E, as a frequency band to be used in the direct connection mode. If the CPU 154 determines that 5 GHz is set (YES in step S701), the processing proceeds to step S702. If the CPU 154 determines that 2.4 GHz is set (NO in step S701), the processing proceeds to step S705.

In step S702, the CPU 154 determines whether the communication apparatus 151 is infrastructure-connected.

If the communication apparatus 151 is infrastructure-connected, the CPU 154 then identifies the channel being used in the infrastructure connection mode, and determines whether the channel being used in the infrastructure connection mode is the channel 36. In other words, in the processing, the CPU 154 determines whether the communication apparatus 151 is infrastructure-connected, and the channel being used in the infrastructure connection mode is the channel 36. The infrastructure-connected state means a state in which the communication apparatus 151 connected with the access point 131 is operating in the infrastructure connection mode. The channel identified in this step corresponds to the channel that is being used in the infrastructure connection mode when the processing that triggers the activation of the direct connection mode is performed. If the CPU 154 determines that the communication apparatus 151 is infrastructure-connected, and the channel being used in the infrastructure connection mode is the channel 36 (YES in step S702), the processing proceeds to step S703. On the other hand, if the CPU 154 determines that the communication apparatus 151 is not connected with the access point 131, in which the communication apparatus 151 is not infrastructure-connected, or if the CPU 154 determines that the communication apparatus 151 is infrastructure-connected, but the channel being used in the infrastructure connection mode is not the channel 36 (NO in step S702), the processing proceeds to step S704. The case where the communication apparatus 151 is infrastructure-connected means the case where the operation for activating the direct connection mode is performed on the communication apparatus 151 while the communication apparatus 151 is operating in the infrastructure connection mode (infrastructure-connected).

In step S703, the CPU 154 sets the channel 40 as the channel to be used in the direct connection mode, and activates the direct connection mode. Specifically, for example, the CPU 154 operates the communication apparatus 151 in the software AP mode using the channel 40, or in the WFD mode using the channel 40. The communication apparatus 151 thereby operates concurrently in the infrastructure connection mode using the channel 36, and in the direct connection mode using the channel 40. After that, the CPU 154 ends the processing. The start of an operation in the direct connection mode brings the communication apparatus 151 to be able to establish direct connection with another apparatus through the processing in the sequence described with reference to FIG. 3 or 4.

On the other hand, in step S704, the CPU 154 sets the channel 36 as a channel to be used in the direct connection mode, and activates the direct connection mode. Specifically, for example, the CPU 154 operates the communication apparatus 151 in the software AP mode using the channel 36, or in the WFD mode using the channel 36. The communication apparatus 151 thereby concurrently operates in the infrastructure connection mode using a channel other than the channel 36, and in the direct connection mode using the channel 36, for example. Alternatively, the communication apparatus 151 operates in the direct connection mode alone using the channel 36, for example. After that, the CPU 154 ends the processing.

In step S705, the CPU 154 determines whether the communication apparatus 151 is infrastructure-connected. If the communication apparatus 151 is infrastructure-connected, the CPU 154 then identifies the channel being used in the infrastructure connection mode, and determines whether the channel being used in the infrastructure connection mode is the channel 3. In other words, in the processing, the CPU 154 determines whether the communication apparatus 151 is infrastructure-connected, and the channel being used in the infrastructure connection mode is the channel 3. The channel identified in this step corresponds to the channel that is being used in the infrastructure connection mode when the processing that triggers the activation of the direct connection mode is performed. If the CPU 154 determines that the communication apparatus 151 is infrastructure-connected, and the channel being used in the infrastructure connection mode is the channel 3 (YES in step S705), the processing proceeds to step S706. On the other hand, if the CPU 154 determines that the communication apparatus 151 is not connected with the access point 131, in which the communication apparatus 151 is not infrastructure-connected, or if the CPU 154 determines that the communication apparatus 151 is infrastructure-connected, but the channel being used in the infrastructure connection mode is not the channel 3 (NO in step S705), the processing proceeds to step S707.

In step S706, the CPU 154 sets the channel 11 as a channel to be used in the direct connection mode, and activates the direct connection mode. Specifically, for example, the CPU 154 operates the communication apparatus 151 in the software AP mode using the channel 11, or in the WFD mode using the channel 11. The communication apparatus 151 thereby operates concurrently in the infrastructure connection mode using the channel 3, and in the direct connection mode using the channel 11. After that, the CPU 154 ends the processing.

On the other hand, in step S707, the CPU 154 sets the channel 3 as a channel to be used in the direct connection mode, and activates the direct connection mode. Specifically, for example, the CPU 154 operates the communication apparatus 151 in the software AP mode using the channel 3, or in the WFD mode using the channel 3. The communication apparatus 151 thereby concurrently operates in the infrastructure connection mode using a channel other than the channel 3 and in the direct connection mode using the channel 3, for example. Alternatively, the communication apparatus 151 operates in the direct connection mode alone using the channel 3, for example. After that, the CPU 154 ends the processing.

By the above-described processing, if the operation for activating the direct connection mode is performed on the communication apparatus 151 while the communication apparatus 151 is operating in the infrastructure connection mode, a channel to be used in the infrastructure connection mode and a channel to be used in the direct connection mode can be made different. Thus, this configuration prevents the occurrence of interference in communication in the infrastructure connection mode and communication in the direct connection mode.

Channels determined in steps S703, S704, S706, and S707 as channels to be used are not limited to the above-described channels. As long as the channels are determined in such a manner that a channel to be used in the infrastructure connection mode and a channel to be used in the direct connection mode are made different from each other, channels different from the above-described channels may be determined to be channels to be used. Specifically, for example, in step S703, the channel 44 or 48 may be set as a channel to be used in the direct connection mode. At this time, a channel other than the channels corresponding to the DFS bands is desirably set.

The above description has been given of a configuration in which the channel 36 is preferentially used over the channel 40 with 5 GHz set on the screen illustrated in FIG. 2E as a frequency band to be used in the direct connection mode. The above description has also been given of a configuration in which the channel 3 is preferentially used over the channel 11 with 2.4 GHz set on the screen illustrated in FIG. 2E as a frequency band to be used in the direct connection mode. The present exemplary embodiment is not limited to this configuration. A channel to be preferentially used may be a different channel.

Control may be performed in such a manner that a channel to be used in the infrastructure connection mode and a channel to be used in the direct connection mode are made different from each other by processing partially different from the above-described processing. For example, in place of the processing in step S702, the CPU 154 may only determine whether the communication apparatus 151 is infrastructure-connected. If the CPU 154 determines that the communication apparatus 151 is infrastructure-connected, the CPU 154 may then identify the channel being used in the infrastructure connection mode, and then, the CPU 154 may specify a channel different from the channel used in the infrastructure connection mode from among a plurality of channels corresponding to the 5-GHz frequency band that are usable by the communication apparatus 151. After that, the CPU 154 may then set the specified channel as a channel to be used in the direct connection mode, and activate the direct connection mode. In this case, a channel to be preferentially specified may be preset. Specifically, for example, the channel 36 may be preferentially specified as a channel to be used in the direct connection mode. Similarly, in place of the processing in step S705, for example, the CPU 154 may only determine whether the communication apparatus 151 is infrastructure-connected. If the CPU 154 determines that the communication apparatus 151 is infrastructure-connected, the CPU 154 may then identify the channel being used in the infrastructure connection mode. After that, the CPU 154 may specify a channel different from the channel used in the infrastructure connection mode from among a plurality of channels corresponding to the 2.4-GHz frequency band that are usable by the communication apparatus 151. After that, the CPU 154 may then set the specified channel as a channel to be used in the direct connection mode, and activate the direct connection mode. In this case, a channel to be preferentially specified may be preset. Specifically, for example, the channel 11 may be preferentially specified as a channel to be used in the direct connection mode.

The above description has been given of a configuration in which the WFD mode is the Autonomous GO mode, but if the WFD mode is not the Autonomous GO mode but a mode involving the execution of GO Negotiation, the processing may be performed at a timing different from the above-described timing. In other words, the processing illustrated in FIG. 7 may be started in a case other than the case where the processing that triggers the activation of the direct connection mode is performed. Specifically, the processing illustrated in FIG. 7 may be started in a case where a device search command of WFD from the information processing apparatus 101 is received the communication apparatus 151, GO Negotiation is performed, and it is determined that the communication apparatus 151 will operate as the GO.

<Control to be Performed if Infrastructure Connection Mode is Newly Activated>

Processing to be performed by the communication apparatus 151 in the present exemplary embodiment will be described with reference to FIG. 8. The processing to be performed by the communication apparatus 151 in this flowchart is performed by the CPU 154 loading various types of program stored in a memory such as the ROM 152, onto the RAM 153, and running the programs. The processing is started if processing that triggers the activation of the infrastructure connection mode is performed, and the communication apparatus 151 has tried to establish the connection with the access point 131 as described with reference to FIG. 5. The processing that triggers the activation of the infrastructure connection mode is processing in which the communication apparatus 151 receives the above-described operation for activating the infrastructure connection mode from the user, for example. The processing that triggers the activation of the infrastructure connection mode is processing of receiving a power-on operation after the power is turned off while the communication apparatus 151 is operating in the infrastructure connection mode, for example.

In step S801, the CPU 154 determines whether the communication apparatus 151 has completed the establishment of infrastructure connection (i.e., connection between the communication apparatus 151 and the access point 131). If the CPU 154 determines that the communication apparatus 151 has completed the establishment of infrastructure connection (YES in step S801), the processing proceeds to step S802. If the CPU 154 determines that the communication apparatus 151 has not completed the establishment of infrastructure connection (NO in step S801), the CPU 154 repeats the processing in step S801 until the establishment of infrastructure connection is completed.

In step S802, the CPU 154 stores information indicating the channel being used in the infrastructure connection mode into a memory included in the communication apparatus 151. As a channel to be used in the infrastructure connection mode is determined by the access point 131 as described above, the channel indicated by the information stored in this step is a channel determined by the access point 131.

In step S803, the CPU 154 determines whether the communication apparatus 151 is operating in the direct connection mode. A case where the CPU 154 determines that the communication apparatus 151 is operating in the direct connection mode (YES in step S803) means a case where the operation for activating the infrastructure connection mode has been performed on the communication apparatus 151 during the operation of the communication apparatus 151 in the direct connection mode. A case where the CPU 154 determines that the communication apparatus 151 is not operating in the direct connection mode (NO in step S803) means a case where the operation for activating the infra- structure connection mode has been performed on the com- munication apparatus 151 with the communication appara- tus 151 not operating in the direct connection mode. The state in which the communication apparatus 151 is operating in the direct connection mode includes a state in which the communication apparatus 151 is operating in the direct connection mode with direct connection not established by the communication apparatus 151. The state in which the communication apparatus 151 is operating in the direct connection mode further includes a state in which the communication apparatus 151 is operating in the direct connection mode with direct connection established direct connection by the communication apparatus 151. The state in which the communication apparatus 151 is operating in the direct connection mode with direct connection not established by the communication apparatus 151 is a state in which the communication apparatus 151 is operating as a GO or a software AP with direct connection with another apparatus not established. If the CPU 154 determines that the communication apparatus 151 is operating in the direct connection mode (YES in step S803), the processing pro- ceeds to step S804. If the CPU 154 determines that the communication apparatus 151 is not operating in the direct connection mode (NO in step S803), the CPU 154 ends the processing while keeping the communication apparatus 151 operating in the infrastructure connection mode alone.

In step S804, the CPU 154 determines whether the channel being used in the infrastructure connection mode and the channel being used in the direct connection mode are identical to each other. The channel being used in the infrastructure connection mode is indicated by the informa- tion stored in step S802. If the CPU 154 determines that the channel being used in the infrastructure connection mode and the channel being used in the direct connection mode are identical to each other (YES in step S804), the processing proceeds to step S805. If the CPU 154 determines that the channel being used in the infrastructure connection mode and the channel being used in the direct connection mode are not identical to each other (NO in step S804), the CPU 154 ends the processing while keeping the communication appa- ratus 151 concurrently operating in the infrastructure con- nection mode and the direct connection mode, without disconnecting direct connection nor stopping the direct connection mode.

In step S805, the CPU 154 stops the operation in the direct connection mode being performed by the communication apparatus 151. If the communication apparatus 151 has established direct connection, the direct connection is dis- connected.

In step S806, the CPU 154 activates the direct connection mode of the communication apparatus 151 again. In other words, the CPU 154 performs the processing illustrated in the flowchart in FIG. 7. The direct connection mode is thereby newly activated while the communication apparatus 151 is operating in the infrastructure connection mode. In such a case, as described above with reference to FIG. 7, control is performed in such a manner that a channel different from the channel being used in the infrastructure connection mode is used in the newly-activated direct con- nection mode.

By the above-described processing, if the operation for activating the infrastructure connection mode is performed on the communication apparatus 151 while the communi- cation apparatus 151 is operating in the direct connection mode, the channel to be used in the infrastructure connection mode and the channel to be used in the direct connection mode can be made different. This prevents the occurrence of interference in communication in the infrastructure connec- tion mode and communication in the direct connection mode.

<Control to be Performed if Channel being Used in Infra- structure Connection Mode is Changed During Concurrent Operation>

As described above, a channel to be used in the infra- structure connection mode is determined by the access point 131. Thus, if a channel being used by the access point 131 is changed by the control for congestion avoidance, or by setting change of the access point 131 that is made by the user, the communication apparatus 151 will change a chan- nel being used in the infrastructure connection mode. Con- trol to be performed when a channel being used in the infrastructure connection mode is changed during the con- current operation will now be described.

Figure 9:
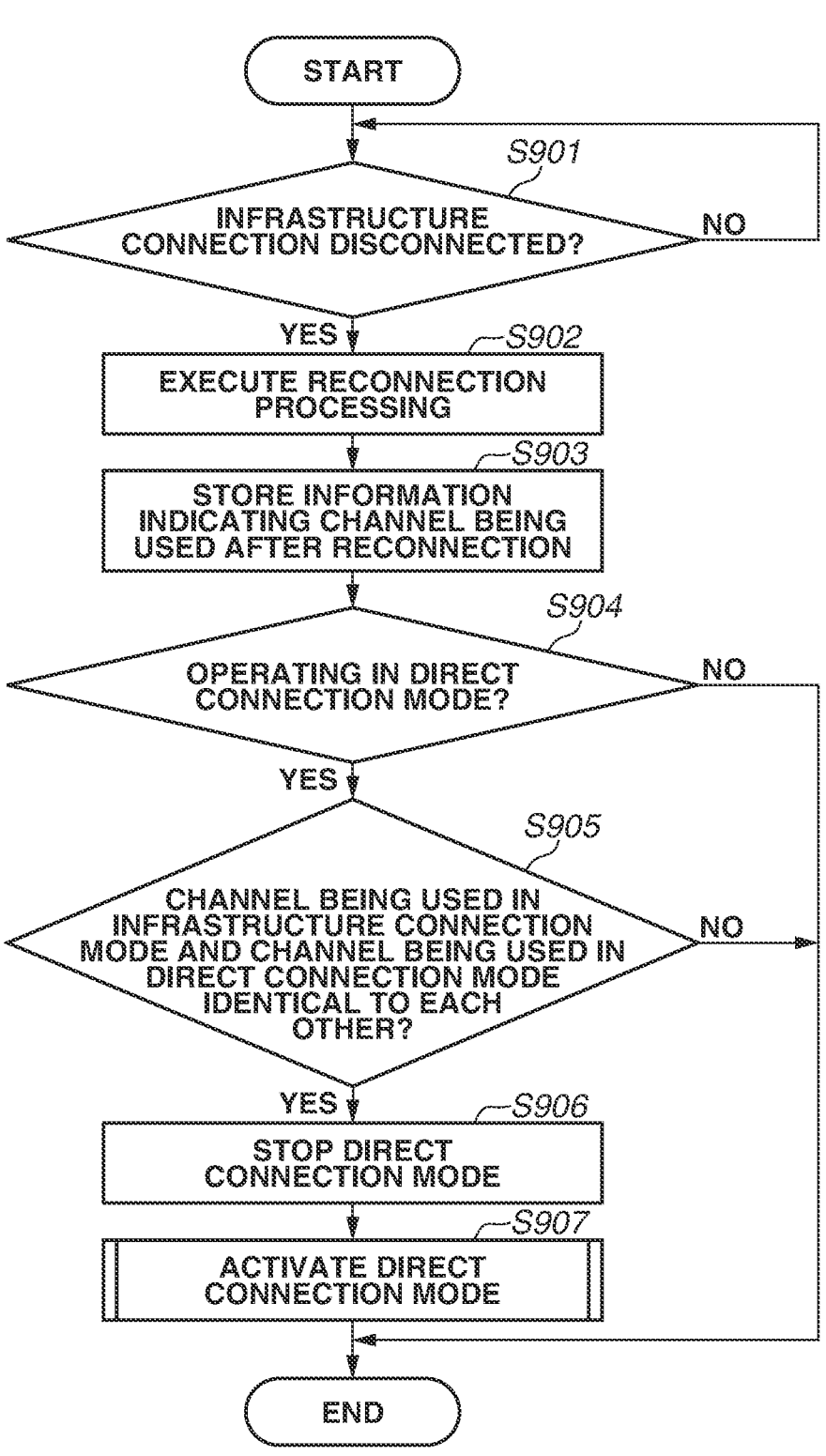
FIG. 9 is a flowchart illustrating processing to be performed by the communication apparatus.

Processing to be performed by the communication appa- ratus 151 in the present exemplary embodiment will be described with reference to FIG. 9. The processing to be performed by the communication apparatus 151 in this flowchart is performed by the CPU 154 loading various types of program stored in a memory such as the ROM 152, onto the RAM 153, and running the programs. The process- ing is started while the communication apparatus 151 is operating in the infrastructure connection mode.

In step S901, the CPU 154 determines whether infrastruc- ture connection is disconnected. If the CPU 154 determines that infrastructure connection is disconnected (YES in step S901), the processing proceeds to step S902. If the CPU 154 determines that infrastructure connection is not discon- nected (NO in step S901), the CPU 154 repeats the process- ing in step S901 until infrastructure connection is discon- nected. If the channel being used by the access point 131 is changed, infrastructure connection with the access point 131 is disconnected. Thus, the processing corresponds to pro- cessing of determining whether a channel being used by the access point 131 is changed. There is another access point 131 that has a function of notifying the communication apparatus 151 that the channel being used by the access point 131 will be changed, before infrastructure connection is disconnected by the change of a channel being used by the access point 131. Thus, the processing may be processing of determining whether the communication apparatus 151 is notified that a channel being used by the access point 131 will be changed.

In step S902, the CPU 154 performs reconnection processing for reconnecting with the access point 131 that was previously connected via the infrastructure connection that has been disconnected. The CPU 154 initially searches for the access point 131 that was previously connected via the infrastructure connection that has been disconnected, as the reconnection processing, sequentially using channels usable by the communication apparatus 151. The access point 131 that was previously connected via the infrastructure connection that has been disconnected can be identified using a service set identifier (SSID). If the access point 131 is discovered, the CPU 154 establishes infrastructure connection with the access point 131 using the channel used in the discovery. An operation in the infrastructure connection mode that uses the channel used in the discovery is thereby started. A search method for the access point 131 that was previously connected via the infrastructure connection that has been disconnected is not limited to the above-described method. For example, the CPU 154 may initially search for the access point 131 using the channel alone used in the infrastructure connection that has been disconnected. After that, if the access point 131 is not discovered by the search, the CPU 154 may search for the access point 131 using another channel.

In step S903, the CPU 154 stores information indicating a changed channel, into a memory included in the communication apparatus 151.

In step S904, the CPU 154 determines whether the communication apparatus 151 is operating in the direct connection mode. A case where the CPU 154 determines that the communication apparatus 151 is operating in the direct connection mode (YES in step S904) means a case where the channel being used in the infrastructure connection mode has been changed during the concurrent operation performed by the communication apparatus 151. A case where the CPU 154 determines that the communication apparatus 151 is not operating in the direct connection mode (NO in step S904) means a case where the channel being used in the infrastructure connection mode has been changed during the operation by the communication apparatus 151 in the infrastructure connection mode alone, without concurrent operation performed by the communication apparatus 151. If the CPU 154 determines that the communication apparatus 151 is operating in the direct connection mode (YES in step S904), the processing proceeds to step S905. If the CPU 154 determines that the communication apparatus 151 is not operating in the direct connection mode (NO in step S904), the CPU 154 ends the processing while keeping the communication apparatus 151 operating in the infrastructure connection mode alone.

In step S905, the CPU 154 determines whether the channel being used in the infrastructure connection mode (i.e., changed channel), and the channel being used in the direct connection mode are identical to each other. The channel being used in the infrastructure connection mode is indicated by the information stored in step S903. If the CPU 154 determines that the channel being used in the infrastructure connection mode and the channel being used in the direct connection mode are identical to each other (YES in step S905), the processing proceeds to step S906. If the CPU 154 determines that the channel being used in the infrastructure connection mode and the channel being used in the direct connection mode are not identical to each other (NO in step S905), the CPU 154 ends the processing while keeping the communication apparatus 151 concurrently operating in the infrastructure connection mode and the direct connection mode, without stopping the direct connection mode.

In step S906, the CPU 154 stops the operation in the direct connection mode that is being performed by the communication apparatus 151. If the communication apparatus 151 has established direct connection, the direct connection is disconnected.

In step S907, the CPU 154 activates the direct connection mode of the communication apparatus 151 again. In other words, the CPU 154 performs the processing illustrated in the flowchart in FIG. 7. The direct connection mode is thereby newly activated while the communication apparatus 151 is operating in the infrastructure connection mode. In such a case, as described above with reference to FIG. 7, control is performed in such a manner that a channel different from the channel being used in the infrastructure connection mode is used in the newly-activated direct connection mode.

In the above description, the communication apparatus 151 stops the operation in the direct connection mode after the reconnection processing is performed in step S902, but the procedure is not limited to this. The communication apparatus 151 may stop the operation in the direct connection mode at a timing that is after the infrastructure connection is disconnected in step S901 and before reconnection processing is performed in step S902.

A second exemplary embodiment will be described. The above description has been given of a configuration in which, if the infrastructure connection mode is newly activated while the communication apparatus 151 is operating in the direct connection mode, the channel being used in the direct connection mode is changed irrespective of whether the communication apparatus 151 has established direct connection.

In the present exemplary embodiment, the description will be given of a configuration in which, if the infrastructure connection mode is newly activated while the communication apparatus 151 is operating in the direct connection mode but the communication apparatus 151 has not established direct connection, the channel being used in the direct connection mode is not changed.

Figure 10:
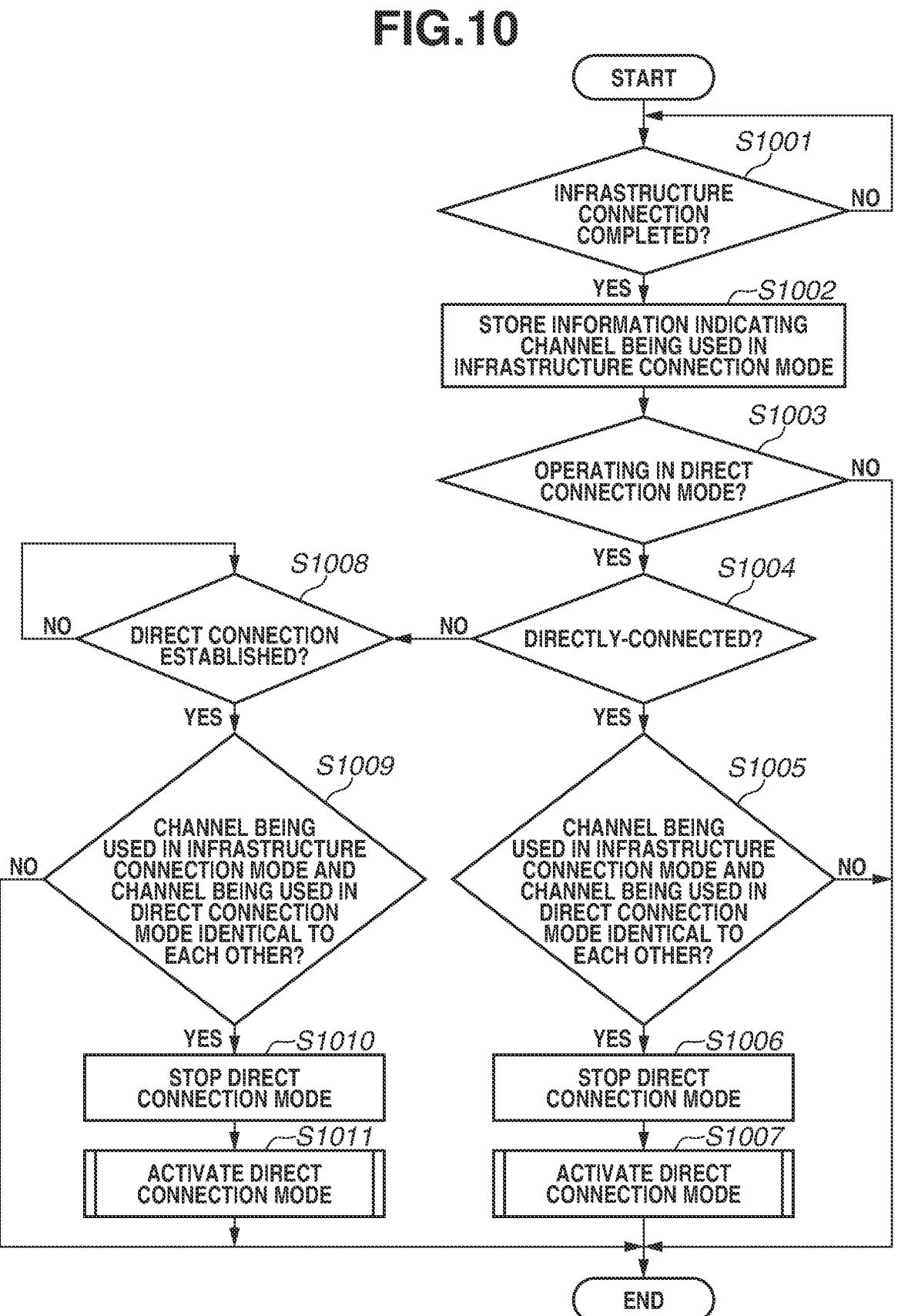
FIG. 10 is a flowchart illustrating processing to be performed by the communication apparatus.

The configuration of a communication system according to the present exemplary embodiment is similar to the configuration of the communication system according to the first exemplary embodiment unless otherwise stated. Specifically, in the present exemplary embodiment, processing illustrated in a flowchart in FIG. 10 is performed in place of the processing according to the first exemplary embodiment that is illustrated in the flowchart in FIG. 9, but the processing in the other flowcharts are similarly performed.

<Control to be Performed if Infrastructure Connection Mode is Newly Activated>

Processing to be performed by the communication apparatus 151 in the present exemplary embodiment will be described with reference to FIG. 10. The processing to be performed by the communication apparatus 151 in this flowchart is performed by the CPU 154 loading various types of program stored in a memory such as the ROM 152, onto the RAM 153, and running the programs. The processing is started if the communication apparatus 151 has tried to establish the connection with the access point 131 as described with reference to FIG. 5 in response to the reception of the above-described operation for activating the infrastructure connection mode from the user by the communication apparatus 151.

The processing in steps S1001 to S1003 is similar to the processing in steps S801 to S803, and the description will be omitted.

In step S1004, the CPU 154 determines whether the communication apparatus 151 is directly-connected. A case where the CPU 154 determines that the communication apparatus 151 is directly-connected (YES in step S1004) means a case where the communication apparatus 151 is operating in the direct connection mode, and the communication apparatus 151 has established direct connection. On the other hand, a case where the CPU 154 determines that the communication apparatus 151 is not directly-connected (NO in step S1004) means a case where the communication apparatus 151 is operating in the direct connection mode but the communication apparatus 151 has not established direct connection. If the CPU 154 determines that the communication apparatus 151 is directly-connected (YES in step S1004), the processing proceeds to step S1005. If the CPU 154 determines that the communication apparatus 151 is not directly-connected (NO in step S1004), the processing proceeds to step S1008.

The processing in steps S1005 to S1007 is similar to the processing in steps S804 to S806, and the description will be omitted.

In step S1008, the CPU 154 determines whether the communication apparatus 151 has completed the establishment of direct connection. If the CPU 154 determines that the communication apparatus 151 has completed the establishment of direct connection (YES in step S1008), the processing proceeds to step S1009. If the CPU 154 determines that the communication apparatus 151 has not completed the establishment of direct connection (NO in step S1008), the CPU 154 repeats the processing in step S1008 until the establishment of direct connection is completed. Further, if the infrastructure connection is disconnected before the establishment of direct connection is completed, the CPU 154 ends the processing.

The processing in steps S1009 to S1011 is similar to the processing in steps S804 to S806, and the description will be omitted.

The control as described in the present exemplary embodiment can also make a channel being used in the infrastructure connection mode and a channel being used in the direct connection mode different from each other. This prevents the occurrence of interference in communication in the infrastructure connection mode and communication in the direct connection mode.

A third exemplary embodiment will be described. In the above-described exemplary embodiments, the communication apparatus 151 searches for an access point existing near the communication apparatus 151, sequentially using channels usable by the communication apparatus 151, and displays a list of access points discovered by the search, as processing for establishing infrastructure connection. Then, the communication apparatus 151 establishes infrastructure connection with an access point selected from the list.

In the present exemplary embodiment, the description will be given of a configuration of making a channel being used in the infrastructure connection mode and a channel being used in the direct connection mode different from each other by searching for an access point existing near the communication apparatus 151, using a method different from the methods in the above-described exemplary embodiments.

The configuration of a communication system according to the present exemplary embodiment is similar to the configurations of the communication systems according to the first and second exemplary embodiments unless otherwise stated.

<Control to be Performed in Search for Access Point Existing Near Communication Apparatus 151>

Figure 11:
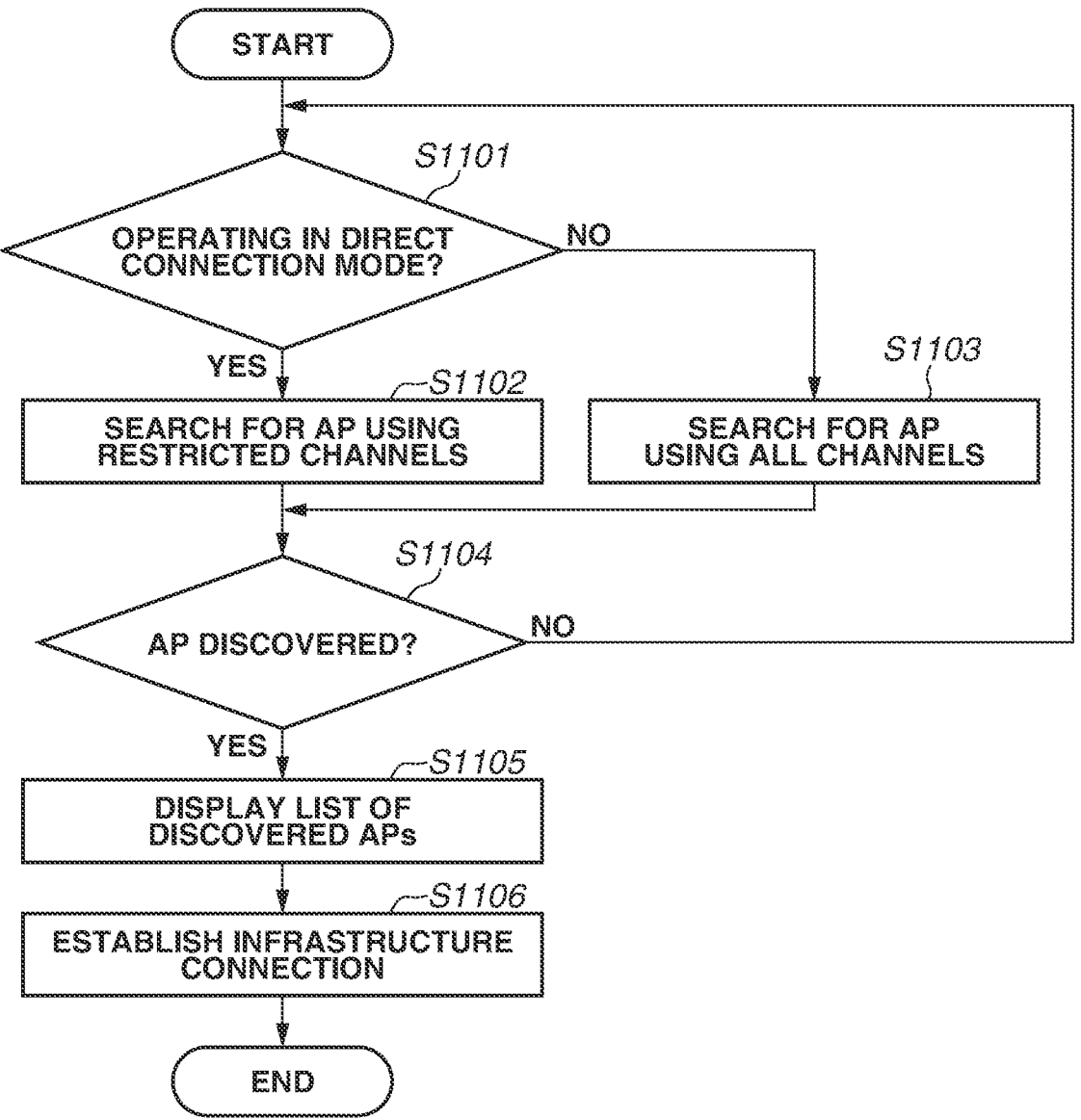
FIG. 11 is a flowchart illustrating processing to be performed by the communication apparatus.

Processing to be performed by the communication apparatus 151 in the present exemplary embodiment will be described with reference to FIG. 11. The processing to be performed by the communication apparatus 151 in this flowchart is performed by the CPU 154 loading various types of program stored in a memory such as the ROM 152, onto the RAM 153, and running the programs. The processing is started if the above-described operation for activating the infrastructure connection mode from the user is received by the communication apparatus 151.

In step S1101, the CPU 154 determines whether the communication apparatus 151 is operating in the direct connection mode. If the CPU 154 determines that the communication apparatus 151 is operating in the direct connection mode (YES in step S1101), the processing proceeds to step S1102. If the CPU 154 determines that the communication apparatus 151 is not operating in the direct connection mode (NO in step S1101), the processing proceeds to step S1103.

In step S1102, the CPU 154 identifies the channel being used by the communication apparatus 151 in the direct connection mode. Then, the CPU 154 searches for an access point existing near the communication apparatus 151, sequentially using channels excluding the channel being used by the communication apparatus 151 in the direct connection mode, among all channels usable by the communication apparatus 151. All channels usable by the communication apparatus 151 consists of channels in the 2.4-GHz frequency band, and channels in the 5-GHz frequency band including the DFS bands. The search for an access point existing near the communication apparatus 151 will be referred to as AP search. After that, the CPU 154 advances the processing to step S1104.

In step S1103, the CPU 154 searches for an access point existing near the communication apparatus 151, sequentially using all channels usable by the communication apparatus 151.

In step S1104, the CPU 154 determines whether one or more access points are discovered by the AP search. If the CPU 154 determines that one or more access points are discovered (YES in step S1104), the processing proceeds to step S1105. If the CPU 154 determines that one or more access points are not discovered (NO in step S1104), the processing returns to step S1101. If one or more access points are not discovered by the AP search although the processing are repeated, and a time-out period has elapsed, the CPU 154 may end the processing by ending the AP search, and display a screen indicating that no access point are discovered.

In step S1105, the CPU 154 displays a list of one or more access points discovered by the AP search. Then, the CPU 154 receives the selection of an access point from the list from the user. In the present exemplary embodiment, as described above, control is performed in such a manner that no channel being used by the communication apparatus 151 in the direct connection mode is used in the AP search. For this reason, the list does not include the access point using the channel being used by the communication apparatus 151 in the direct connection mode.

In step S1106, the CPU 154 transmits a connection request to the selected access point, and establishes infrastructure connection with the selected access point. The channel used in the search and discovery of the selected access point is used for the transmission of the connection request and communication via the established infrastructure connection.

The control according to the present exemplary embodiment in the form of establishing infrastructure connection using the first method prevents a channel being used in the direct connection mode and a channel being used in the infrastructure connection mode from being identical to each other. This configuration allows a channel to be used in the infrastructure connection mode and a channel to be used in the direct connection mode to be different from each other, preventing the occurrence of interference in communication in the infrastructure connection mode and communication in the direct connection mode.

Figure 8:
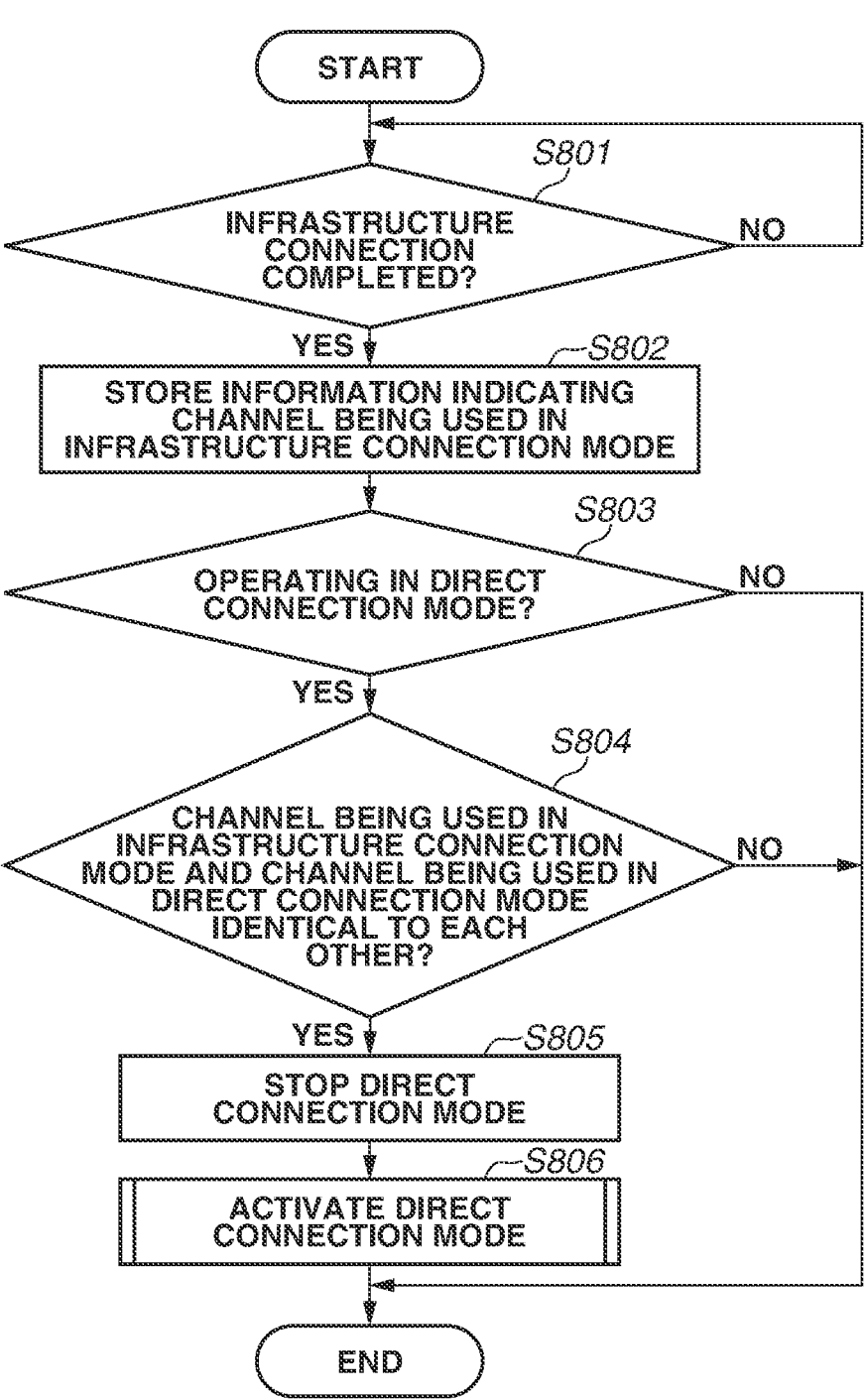
FIG. 8 is a flowchart illustrating processing to be performed by the communication apparatus.

In the present exemplary embodiment, a form may be applied in which the processing in steps S803 to S806 in the processing illustrated in the flowchart in FIG. 8 is not performed. If infrastructure connection is established using the second method or the third method, in the processing illustrated in the flowchart in FIG. 8, the processing in steps S803 to S806 may be performed. In other words, it may be controlled whether to perform the processing in steps S803 to S806 in the processing illustrated in the flowchart in FIG. 8 based on the method used for establishing infrastructure connection.

The control according to the present exemplary embodiment may be applied also to AP search other than AP search to be started if the operation for activating the infrastructure connection mode from the user is received by the communication apparatus 151. Specifically, for example, the control according to the present exemplary embodiment may be also applied to the reconnection processing in step S902 in the flowchart illustrated in FIG. 9. More specifically, if the communication apparatus 151 is operating in the direct connection mode, the CPU 154 may search for the access point 131 sequentially using channels excluding the channel identified as a channel being used by the communication apparatus 151 in the direct connection mode, among all channels usable by the communication apparatus 151.

A fourth exemplary embodiment will be described. In the present exemplary embodiment, the description will be given of a configuration of making a channel being used in the infrastructure connection mode and a channel being used in the direct connection mode different from each other, by searching for an access point existing near the communication apparatus 151 using a method different from the methods in the above-described exemplary embodiments.

<Control to be Performed in Search for Access Point Existing Near Communication Apparatus 151>

Figure 12:
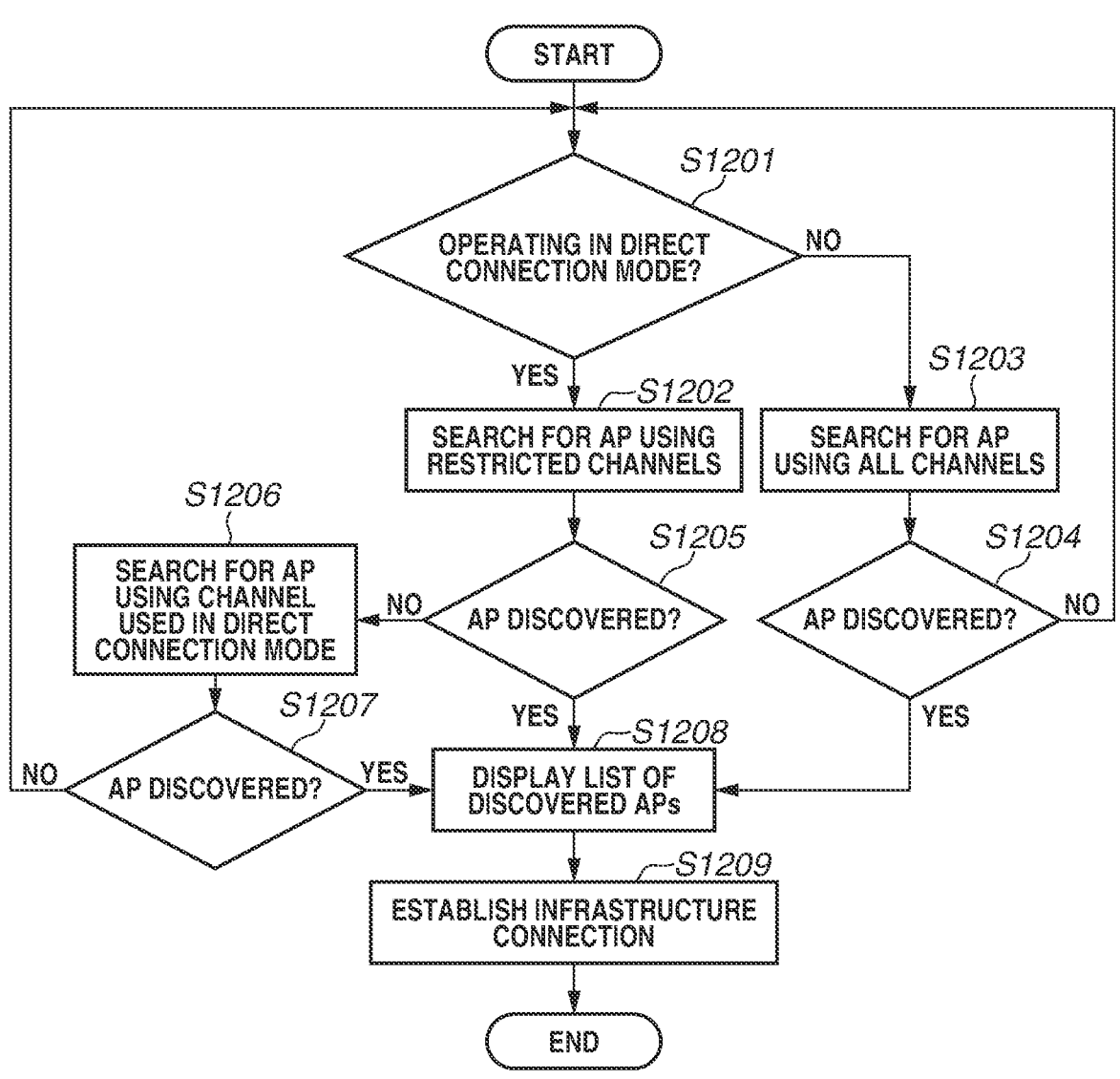
FIG. 12 is a flowchart illustrating processing to be performed by the communication apparatus.

Processing to be performed by the communication apparatus 151 in the present exemplary embodiment will be described with reference to FIG. 12. The processing to be performed by the communication apparatus 151 in this flowchart is performed by the CPU 154 loading various types of program stored in a memory such as the ROM 152, onto the RAM 153, and running the programs. The processing is started if the above-described operation for activating the infrastructure connection mode from the user is received by the communication apparatus 151.

The configuration of a communication system according to the present exemplary embodiment is similar to the configurations of the communication systems according to the above-described exemplary embodiments unless otherwise stated. Specifically, in the present exemplary embodiment, processing illustrated in a flowchart in FIG. 12 is performed in place of the processing according to the third exemplary embodiment that is illustrated in the flowchart in FIG. 11, but the processing in the other flowcharts are similarly performed.

The processing in steps S1201 to S1204 is similar to the processing in steps S1101 to S1104, and the description will be omitted.

In step S1205, the CPU 154 determines whether one or more access points are discovered by the AP search in step S1202. If the CPU 154 determines that one or more access points are discovered (YES in step S1205), the processing proceeds to step S1208. If the CPU 154 determines that one or more access points are not discovered (NO in step S1205), the processing proceeds to step S1206.

In step S1206, the CPU 154 searches for an access point existing near the communication apparatus 151, using the channel being used by the communication apparatus 151 in the direct connection mode. In the processing, at least the channel being used by the communication apparatus 151 in the direct connection mode will be used. For this reason, in the processing, the CPU 154 may search for an access point existing near the communication apparatus 151, sequentially using all channels usable by the communication apparatus 151, for example.

In step S1207, the CPU 154 determines whether one or more access points are discovered by the AP search in step S1206. If the CPU 154 determines that one or more access points are discovered (YES in step S1207), the processing proceeds to step S1208. If the CPU 154 determines that one or more access points are not discovered (NO in step S1207), the processing returns to step S1201. If one or more access points are not discovered by the AP search although the processing is repeated, and a time-out period has elapsed, the CPU 154 may end the processing by ending the AP search, and display a screen indicating that no access point is discovered.

The processing in steps S1208 and S1209 is similar to the processing in steps S1105 and S1106, and the description will be omitted.

The control according to the present exemplary embodiment allows infrastructure connection that uses a channel being used in the direct connection mode not to be established to the extent possible, preventing the occurrence of interference in communication in the infrastructure connection mode and communication in the direct connection mode. If no access point is discovered by AP search using a channel being used in the direct connection mode, AP search using a channel different from the channel being used in the direct connection mode can increase the possibility of discovery of an access point.

The control according to the present exemplary embodiment may be applied also to AP search other than AP search to be started if the operation for activating the infrastructure connection mode from the user is received by the communication apparatus 151. Specifically, for example, the control according to the present exemplary embodiment may be applied also to the reconnection processing in step S902 in the flowchart illustrated in FIG. 9. More specifically, if the communication apparatus 151 is operating in the direct connection mode, the CPU 154 may search for the access point 131 sequentially using channels excluding the channel being used by the communication apparatus 151 in the direct connection mode, among all channels usable by the communication apparatus 151. Then, if the access point 131 is not discovered by the AP search, the CPU 154 may search for the access point 131 using the channel being used by the communication apparatus 151 in the direct connection mode.

A fifth exemplary embodiment will be described. The above description has been given of a configuration in which control is performed in such a manner that a channel being used in the infrastructure connection mode and a channel being used in the direct connection mode are made different from each other, but in the manner, a frequency band being used in the infrastructure connection mode and a frequency band being used in the direct connection mode may be identical to each other.

In the present exemplary embodiment, the description will be given of a configuration in which control is performed in such a manner that a frequency band being used in the infrastructure connection mode and a frequency band being used in the direct connection mode are made different from each other, in addition to making a channel being used in the infrastructure connection mode and a channel being used in the direct connection mode from each other.

<Control to be Performed if Direct Connection Mode is Newly Activated>

Figure 13:
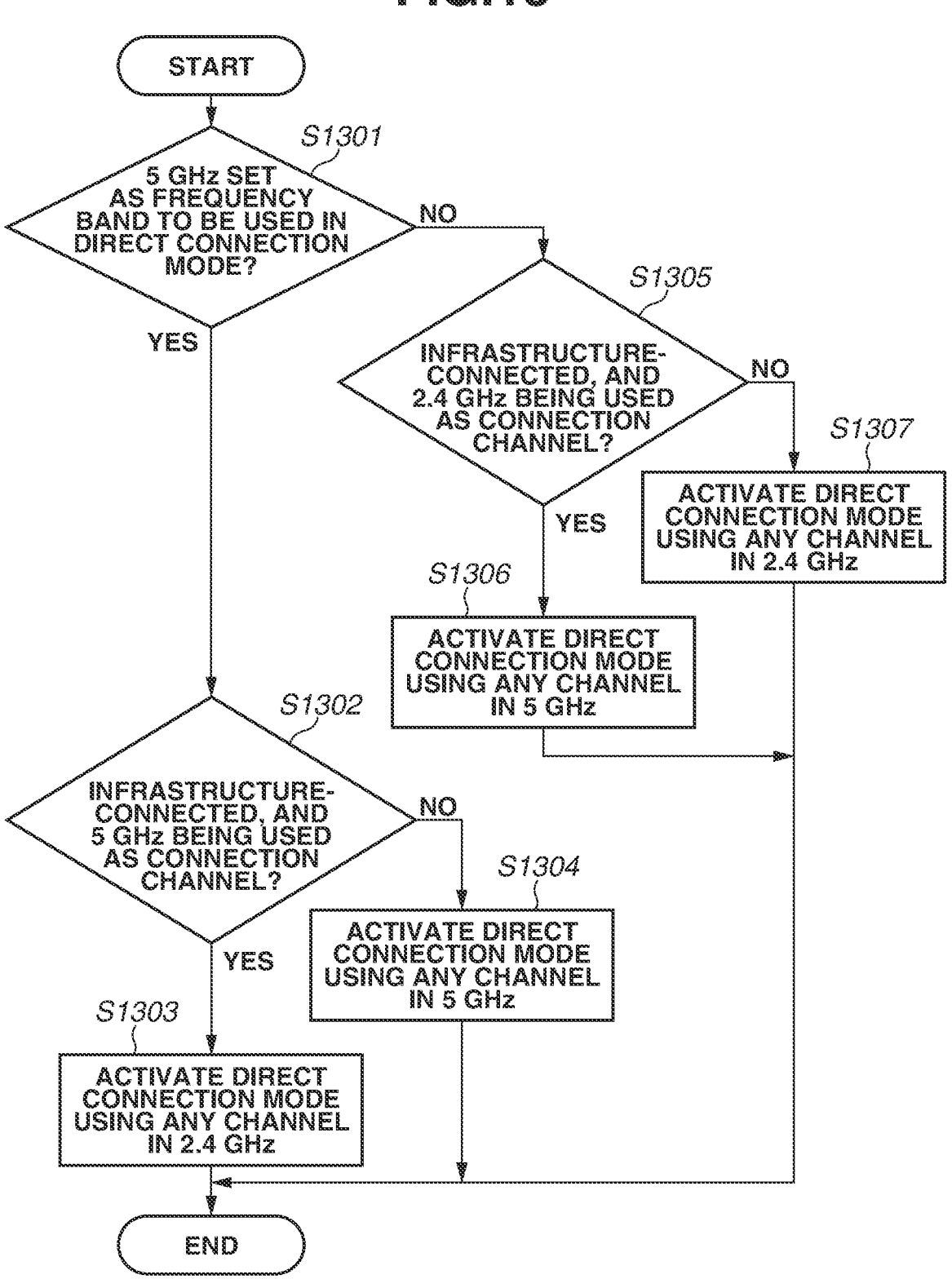
FIG. 13 is a flowchart illustrating processing to be performed by the communication apparatus.

Processing to be performed by the communication apparatus 151 in the present exemplary embodiment will be described with reference to FIG. 13. The processing to be performed by the communication apparatus 151 in this flowchart is performed by the CPU 154 loading various types of program stored in a memory, such as the ROM 152, onto the RAM 153, and running the programs. The processing is started if the processing that triggers the activation of the direct connection mode is performed, for example, if the above-described operation for activating the direct connection mode from the user is received by the communication apparatus 151.

The processing in step S1301 is similar to the processing in step S701, and the description will be omitted.

In step S1302, the CPU 154 determines whether the communication apparatus 151 is infrastructure-connected state. If the communication apparatus 151 is infrastructure-connected, the CPU 154 then identifies the frequency band being used in the infrastructure connection mode, and determines whether the frequency band being used in the infrastructure connection mode is 5 GHz. In other words, in the processing, the CPU 154 determines whether the communication apparatus 151 is infrastructure-connected, and whether the frequency band being used in the infrastructure connection mode is 5 GHz. The frequency band being used in the infrastructure connection mode is identified, for example, based on the identification of the channel being used in the infrastructure connection mode. The frequency band identified in this step is the frequency band used in the infrastructure connection mode when the processing that triggers the activation of the direct connection mode was performed. The case where the frequency band being used in the infrastructure connection mode is 5 GHz means the case where the channel being used in the infrastructure connection mode is a channel in the 5-GHz frequency band. If the CPU 154 determines that the communication apparatus 151 is infrastructure-connected, and the frequency band being used in the infrastructure connection mode is 5 GHz (YES in step S1302), the processing proceeds to step S1303. If the CPU 154 determines that the communication apparatus 151 is not connected with the access point 131, in which the communication apparatus 151 is not infrastructure-connected, or if the CPU 154 determines that the communication apparatus 151 is infrastructure-connected, but the frequency band being used in the infrastructure connection mode is not 5 GHz (NO in step S1302), the processing proceeds to step S1304.

In step S1303, the CPU 154 sets a channel of the channels in the 2.4-GHz frequency band that are usable by the communication apparatus 151, as a channel to be used in the direct connection mode, and activates the direct connection mode. After that, the CPU 154 ends the processing. In this case, a channel to be preferentially used may be preset out of the channels in the 2.4-GHz frequency band that are usable by the communication apparatus 151. Specifically, for example, the channel 11 may be preferentially set as a channel to be used in the direct connection mode. In this case, the CPU 154 may automatically change the setting of a frequency band set on the screen illustrated in FIG. 2E, to 2.4 GHz. In this case, the CPU 154 may display a screen for notifying the user that the 2.4-GHz frequency band will be used in the direct connection mode.

In step S1304, the CPU 154 sets a channel of the channels in the 5-GHz frequency band that are usable by the communication apparatus 151, as a channel to be used in the direct connection mode, and activates the direct connection mode. After that, the CPU 154 ends the processing. In this case, a channel to be preferentially used may be preset out of the channels in the 5-GHz frequency band that are usable by the communication apparatus 151. Specifically, for example, the channel 36 may be preferentially set as a channel to be used in the direct connection mode.

In step S1305, the CPU 154 determines whether the communication apparatus 151 is infrastructure-connected. If the communication apparatus 151 is infrastructure-connected, the CPU 154 then identifies the frequency band being used in the infrastructure connection mode, and determines whether the frequency band being used in the infrastructure connection mode is 2.4 GHz. In other words, in the processing, the CPU 154 determines whether the communication apparatus 151 is infrastructure-connected, and the frequency band being used in the infrastructure connection mode is 2.4 GHz. The frequency band identified in this step is the frequency band used in the infrastructure connection mode when the processing that triggers the activation of the direct connection mode was performed. The frequency band being used in the infrastructure connection mode is identified, for example, based on the identification of the channel being used in the infrastructure connection mode. The case where a frequency band being used in the infrastructure connection mode is 2.4 GHz means a case where the channel being used in the infrastructure connection mode is a channel in the 2.4-GHz frequency band. If the CPU 154 determines that the communication apparatus 151 is infrastructure-connected, and the frequency band being used in the infrastructure connection mode is 2.4 GHz (YES in step S1305), the processing proceeds to step S1306. If the CPU 154 determines that the communication apparatus 151 is not connected with the access point 131, in which the communication apparatus 151 is not infrastructure-connected, or if the CPU 154 determines that the communication apparatus 151 is infrastructure-connected, but the frequency band being used in the infrastructure connection mode is not 2.4 GHz (NO in step S1305), the processing proceeds to step S1307.

In step S1306, the CPU 154 sets a channel of channels in the 5-GHz frequency band that are usable by the communication apparatus 151, as a channel to be used in the direct connection mode, and activates the direct connection mode. After that, the CPU 154 ends the processing. In this case, control may be performed in such a manner that a channel other than a channel the DFS bands out of the channels in the 5-GHz frequency band that are usable by the communication apparatus 151 is set. At this time, a channel to be preferentially used may be determined out of the channels in the 5-GHz frequency band that are usable by the communication apparatus 151. Specifically, for example, the channel 36 may be preferentially set as a channel to be used in the direct connection mode. In this case, the CPU 154 may automatically change the setting of a frequency band set on the screen illustrated in FIG. 2E, to 5 GHz. In this case, the CPU 154 may display a screen for notifying the user that the 5-GHz frequency band will be used in the direct connection mode.

In step S1307, the CPU 154 sets a channel of channels in the 2.4-GHz frequency band that are usable by the communication apparatus 151, as a channel to be used in the direct connection mode, and activates the direct connection mode. After that, the CPU 154 ends the processing. In this case, a channel to be preferentially used may be determined out of the channels in the 2.4-GHz frequency band that are usable by the communication apparatus 151. Specifically, for example, the channel 11 may be preferentially set as a channel to be used in the direct connection mode.

The above-described configuration allows control to be performed in such a manner that a frequency band being used in the infrastructure connection mode and a frequency band being used in the direct connection mode are made different from each other, preventing the occurrence of interference in communication in the infrastructure connection mode and communication in the direct connection mode.

Other Exemplary Embodiments

Needless to say, the object of various embodiments of the present disclosure is also achieved by supplying a recording medium on which program codes of software for implementing functions of the above-described exemplary embodiment are recorded, to a system or an apparatus, and a computer (or a CPU or a micro processing unit (MPU)) of the system or the apparatus reading out the program codes stored in the recording medium, and running the program codes. In this case, program codes read out from a storage medium implements functions of the above-described exemplary embodiment, and the storage medium storing the program codes is included within the scope of the present disclosure.

As a storage medium for supplying program codes, for example, a flexible disk, a hard disk, an optical disk, a magneto-optical disk, a compact disk read only memory (CD-ROM), a CD recordable (CD-R), a magnetic tape, a nonvolatile memory card, a ROM, or a digital versatile disk (DVD) can be used.

Needless to say, a case where an OS operating on the computer performs a part or all of actual processing based on instructions in program codes, and the processing implements functions of the above-described exemplary embodiment, as well as a case where functions of the above-described exemplary embodiment are implemented by the computer running read-out program codes, is included.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-086418, filed May 26, 2022, which is hereby incorporated by reference herein in its entirety.

What is claimed is:

1. A communication apparatus configured to perform an operation in a first mode in which the communication apparatus operates as a child station in accordance with a predetermined wireless communication standard, and an operation in a second mode in which the communication apparatus operates as a parent station in accordance with the predetermined wireless communication standard, the communication apparatus comprising:

a search unit configured to perform search according to the predetermined wireless communication standard for one or more access points;

an establishment unit configured to establish a wireless connection between an access point from the one or more access points discovered in the search by the search unit and the communication apparatus operating in the first mode using a channel used to discover the access point; and a control unit configured to perform control in such a manner that a channel which the communication apparatus uses in the second mode is not used in the search by the search unit while the communication apparatus is operating in the second mode.

2. The communication apparatus according to claim 1, further comprising:

a display control unit configured to display a list of the one or more of access points discovered in the search; and a reception unit configured to receive, from a user, selection of an access point from the list of the one or more of access points, wherein the establishment unit establishes a wireless connection between the access point selected by the user from the list of the one or more access points and the communication apparatus operating in the first mode using a channel used to discover the access point selected by the user.

3. The communication apparatus according to claim 2, wherein an access point using the channel which the communication apparatus uses in the second mode is controlled not to be included in the list.

4. The communication apparatus according to claim 1, wherein the search is to discover a predetermined access point in accordance with the predetermined wireless communication standard in response to disconnection of connection between the communication apparatus operating in the first mode and the predetermined access point.

5. The communication apparatus according to claim 1, further comprising a second control unit configured to perform control in such a manner that a state in which the wireless connection is maintained after the search is performed while the communication apparatus is operating in the second mode and a state in which the communication apparatus is operating in the second mode are concurrently maintained.

6. The communication apparatus according to claim 1, wherein in a case where no access point is discovered in the search performed without using the channel that the communication apparatus uses in the second mode, the search unit performs search for the one or more access points using the channel that the communication apparatus uses in the second mode.

7. The communication apparatus according to claim 1, wherein the search is performed using a channel from among a plurality of channels usable by the communication apparatus other than the channel that communication apparatus uses in the second mode.

8. The communication apparatus according to claim 1, further comprising:

a specification unit configured to perform specification of a channel different from the channel that the communication apparatus uses in the second mode when specific processing to cause the communication apparatus to operate in the first mode is performed, as a channel to be used by the communication apparatus in the second mode after the specific processing is performed, in a case where the specific processing is performed while the communication apparatus is operating in the second mode, the specification being based on a match between the channel that the communication apparatus uses in the second mode when the specific processing is performed and a channel that the communication apparatus uses in the first mode which is started by the specific processing; and a third control unit configured to perform control in such a manner that a state in which the communication apparatus is operating in the first mode and a state in which the communication apparatus is operating in the second mode using the channel specified in the specification are concurrently maintained while the specific processing is performed when the communication apparatus is operating in the second mode.

9. The communication apparatus according to claim 8, the specific processing is at least any of processing to receive, from a user, selection of an access point from a list of the one or more of access points discovered in search by the communication apparatus, processing to receive, from a user, an operation for performing Wi-Fi Protected Setup™ (WPS) or an AirStation One-Touch Secure System™ (AOSS), and processing for reestablishment of connection in the first mode between the communication apparatus and an access point which follows disconnection of the connection in the first mode between the communication apparatus and the access point.

10. The communication apparatus according to claim 1, wherein the second mode is for the communication apparatus to operate as a software access point.

11. The communication apparatus according to claim 1, wherein the second mode is for the communication apparatus to operate as a group owner in a Wi-Fi Direct® standard.

12. The communication apparatus according to claim 1, wherein the predetermined wireless communication standard is an Institute of Electrical and Electronics Engineers (IEEE) 802.11 series communication standard.

13. The communication apparatus according to claim 1, wherein communication in the first mode and communication in the second mode are realized by one wireless chip.

14. The communication apparatus according to claim 1, further comprising a printing unit configured to perform printing.

15. The communication apparatus according to claim 1, further comprising a scanning unit configured to perform scanning.

16. The communication apparatus according to claim 1, wherein the first frequency band is 2.4 GHz and the second frequency band is 5 GHz.

17. The communication apparatus according to claim 1, wherein a 2.4 GHz frequency band and a 5 GHz frequency band are usable for communication in the first mode, and wherein a frequency band, which is either one of a 2.4 GHz frequency band or a 5 GHz frequency band in which a channel change based on Dynamic Frequency Selection (DFS) does not occur, is usable in the second mode.

18. The communication apparatus according to claim 1, wherein a 2.4 GHz frequency band and a 5 GHz frequency band are usable for communication in the first mode, and wherein a 2.4 GHz frequency band is usable but a 5 GHz frequency band is not usable in the second mode.

19. A control method for a communication apparatus configured to perform an operation in a first mode in which the communication apparatus operates as a child station in a predetermined wireless communication standard, and an operation in a second mode in which the communication apparatus operates as a parent station in the predetermined wireless communication standard, the control method comprising:

performing search according to the predetermined wireless communication standard for one or more access points;

establishing a wireless connection between an access point from the one or more access points discovered in the search and the communication apparatus operating in the first mode using a channel used to discover the access point; and performing control in such a manner that a channel which the communication apparatus uses in the second mode is not used in the search while the communication apparatus is operating in the second mode.

20. A non-transitory computer-readable storage medium storing a program for causing a computer to perform a control method for a communication apparatus configured to perform an operation in a first mode in which the communication apparatus operates as a child station in a predetermined wireless communication standard, and an operation in a second mode in which the communication apparatus operates as a parent station in the predetermined wireless communication standard, the control method comprising:

performing search according to the predetermined wireless communication standard for one or more access points;

establishing a wireless connection between an access point from the one or more access points discovered in the search and the communication apparatus operating in the first mode using a channel used to discover the access point; and performing control in such a manner that a channel which the communication apparatus uses in the second mode is not used in the search while the communication apparatus is operating in the second mode.

\*  \*  \*  \*  \*